US012689296B2

(12) United States Patent　　　(10) Patent No.:　US 12,689,296 B2
Kinoshita　　　　　　　　　　　　　(45) Date of Patent:　　　Jul. 21, 2026

(54) DC POWER CONVERTER

(71) Applicant: TMEIC Corporation, Tokyo (JP)

(72) Inventor: Masahiro Kinoshita, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 167 days.

(21) Appl. No.: 18/833,033

(22) PCT Filed: Jan. 16, 2023

(86) PCT No.: PCT/JP2023/001020
§ 371 (c)(1),
(2) Date: Jul. 25, 2024

(87) PCT Pub. No.: WO2024/154199
PCT Pub. Date: Jul. 25, 2024

(65) Prior Publication Data
US 2025/0112554 A1　　Apr. 3, 2025

(51) Int. Cl.
*H02M 1/088* (2006.01)
*H02M 3/07* (2006.01)
*H02M 3/158* (2006.01)
*H02M 1/00* (2006.01)

(52) U.S. Cl.
CPC ........... *H02M 3/158* (2013.01); *H02M 1/088* (2013.01); *H02M 3/1582* (2013.01); *H02M 1/0095* (2021.05); *H02M 3/07* (2013.01)

(58) Field of Classification Search
CPC ...... H02M 3/158; H02M 1/088; H02M 1/007; H02M 3/07; H02M 1/0095; H02M 3/1582
See application file for complete search history.

(56) References Cited

U.S. PATENT DOCUMENTS

2018/0278158 A1* 9/2018 Zheng .................... H02M 3/07

FOREIGN PATENT DOCUMENTS

JP　　　5070937 B2　　11/2012
JP　　　6771700 B1　　10/2020

OTHER PUBLICATIONS

International Search Report & Written Opinion issued Feb. 14, 2023 in PCT/JP2023/001020, filed on Jan. 16, 2023, citing document 16 therein, 11 pages.

* cited by examiner

*Primary Examiner* — Crystal L Hammond
*Assistant Examiner* — Jonathan Walter Soileau
(74) *Attorney, Agent, or Firm* — XSENSUS LLP

(57)　　　　　　　ABSTRACT

A DC power converter includes a chopper circuit. In a step-up mode, in the chopper circuit, a current path that starts from the DC power supply and returns to the DC power supply through the first reactor, the first connection point, the second switch, the third connection point, the second capacitor, and the fourth connection point in order is formed when the first switch is off and the second switch is on, and a current path that starts from DC power supply and returns to the DC power supply through the first reactor, the first connection point, the first diode, the second connection point, the first capacitor, the third connection point, the second capacitor, and the fourth connection point in order is formed when the first switch is off and the second switch is off.

9 Claims, 17 Drawing Sheets

AT TIME OF DISCHARGE FROM Vb TO CAPACITORS (STEP-UP MODE)

AT TIME OF CHARGE FROM CAPACITORS TO Vb (STEP-DOWN MODE)

FIG.4

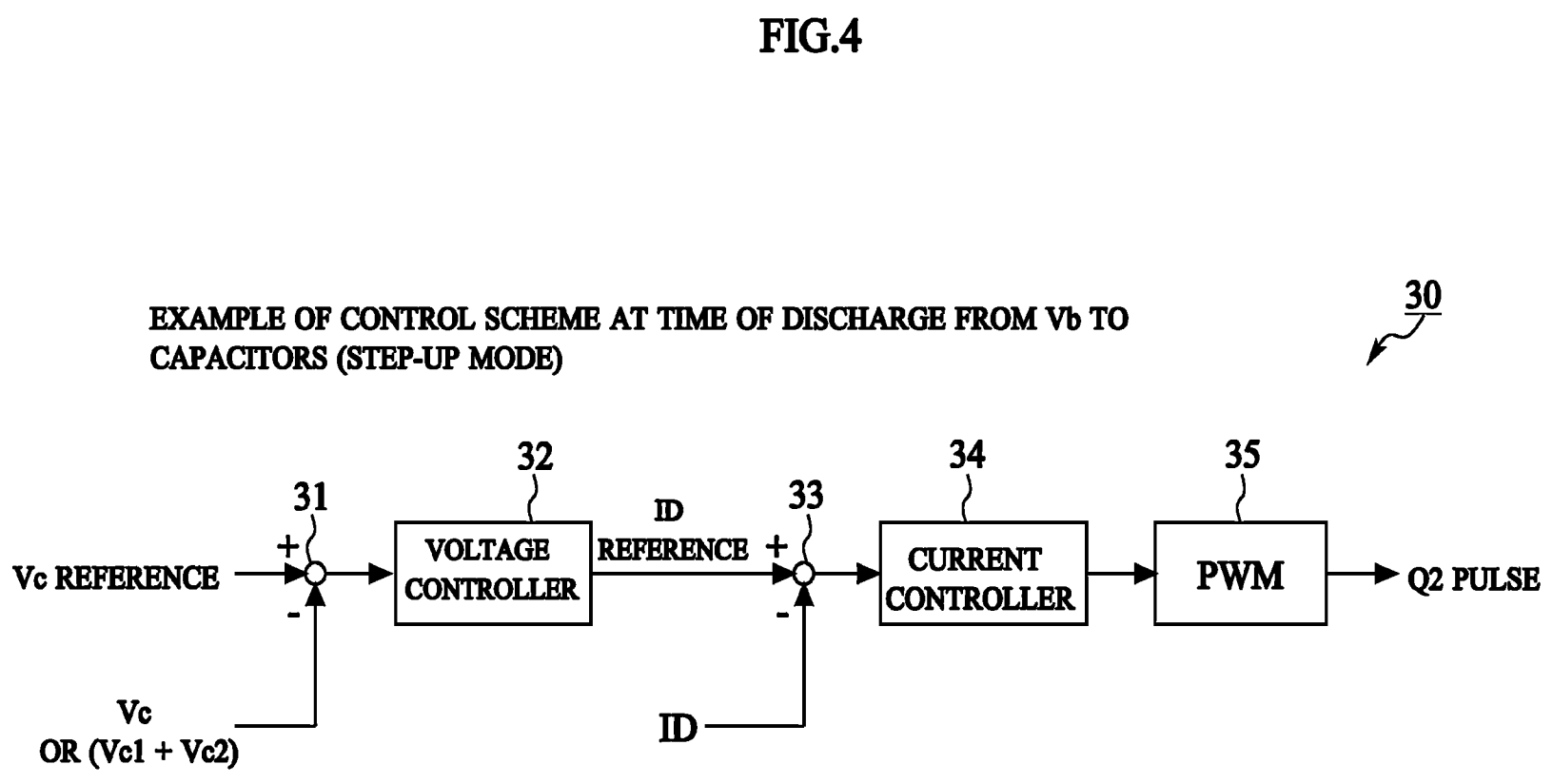

EXAMPLE OF CONTROL SCHEME AT TIME OF DISCHARGE FROM Vb TO
CAPACITORS (STEP-UP MODE)

30

Vc REFERENCE

Vc
OR (Vc1 + Vc2)

31
+
−

32
VOLTAGE
CONTROLLER

ID
REFERENCE

33
+
−

ID

34
CURRENT
CONTROLLER

35
PWM

Q2 PULSE

FIG.5

EXAMPLE OF CONTROL SCHEME AT TIME OF CHARGE FROM CAPACITORS TO
Vb (STEP-DOWN MODE)

CASE OF TRANSFER OF ENERGY ACCUMULATED IN C2 TO
C1 (CASE OF VC1 < VC2)

Q4 OFF to ON

TURN ON Q4 TO
ACCUMULATE
ENERGY IN
REACTOR

Q4 ON to OFF

TURN OFF Q4
TO CHARGE C1
WITH ENERGY
OF REACTOR

FIG.8B

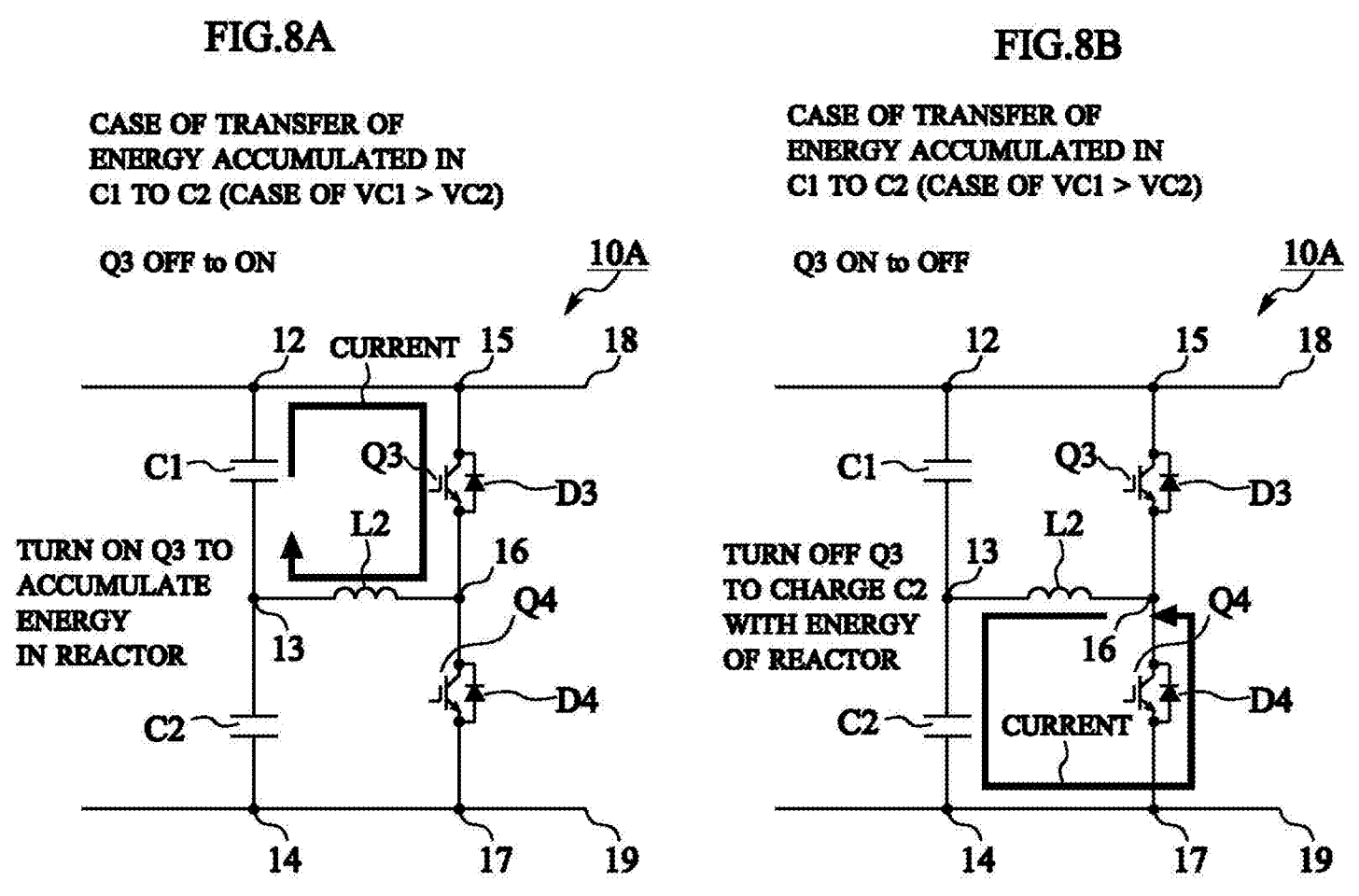

CASE OF TRANSFER OF
ENERGY ACCUMULATED IN
C1 TO C2 (CASE OF VC1 > VC2)

Q3 ON to OFF

10A

18

D3

Q3

15

Q4

D4

16

L2

17

CURRENT

12

C1

13

14

C2

19

TURN OFF Q3
TO CHARGE C2
WITH ENERGY
OF REACTOR

FIG.8A

CASE OF TRANSFER OF
ENERGY ACCUMULATED IN
C1 TO C2 (CASE OF VC1 > VC2)

Q3 OFF to ON

10A

18

D3

15

CURRENT

16

Q4

D4

Q3

L2

17

12

C1

13

14

C2

19

TURN ON Q3 TO
ACCUMULATE
ENERGY
IN REACTOR

FIG.9

EXAMPLE OF CONTROL SCHEME OF CAPACITOR Vc2 (Vc1)

LEAKAGE CURRENT

DC POWER CONVERTER

TECHNICAL FIELD

The present invention relates to a DC power converter.

BACKGROUND ART

Conventionally, a DC power converter including a chopper circuit that changes a DC voltage has been known. In the DC power converter, the chopper circuit changes the DC voltage by repeatedly turning on and off semiconductor switching elements (hereinafter also referred to as "semiconductor switches").

For example, in the case of a step-up mode, the DC power converter (chopper circuit) accumulates the energy of a battery such as a storage battery or a solar cell connected to one of the ends in a reactor and steps up a capacitor connected to the other end by using the energy accumulated in the reactor. Therefore, the DC power converter (chopper circuit) needs the reactor (see, for example, PTLs 1 and 2).

CITATION LIST

Patent Literature

[PTL 1] JP 5070937 B
[PTL 2] JP 6771700 B

SUMMARY OF THE INVENTION

Problems to be Solved by the Invention

FIG. 14 is a diagram illustrating an example of a configuration of a conventional chopper circuit 100 capable of a bidirectional operation. In FIG. 14, the chopper circuit 100 includes a reactor 129 and semiconductor switches 130A and 131A. The semiconductor switches 130A and 131A each include an IGBT (Insulated Gate Bipolar Transistor) or the like. In addition, the chopper circuit 100 includes diodes (freewheeling diodes) 130D and 131D, a smoothing capacitor 132, circuit terminals 133A and 133B, and circuit terminals 135A and 135B. The diodes (freewheeling diodes) 130D and 131D are respectively connected in antiparallel with the semiconductor switches 130A and 131A. It is to be noted that the chopper circuit 100 is capable of a bidirectional operation. In other words, the chopper circuit 100 is capable of operations in the step-up mode and a step-down mode.

In the step-up mode, for example, an unillustrated DC power supply is connected between the circuit terminal 133A and the circuit terminal 133B and an unillustrated load is connected between the circuit terminal 135A and the circuit terminal 135B in the chopper circuit 100. In contrast, in the step-down mode, for example, an unillustrated load is connected between the circuit terminal 133A and the circuit terminal 133B and an unillustrated DC power supply is connected between the circuit terminal 135A and the circuit terminal 135B in the chopper circuit 100. It is to be noted that currents flow in the chopper circuit 100 in the directions of the respective arrows illustrated in FIG. 14 in the step-up mode and the step-down mode.

In a case where the chopper circuit 100 is in the step-up mode, the semiconductor switch 130A is turned on and off on the basis of a duty ratio that is decided by a voltage V of the unillustrated DC power supply between the circuit terminal 133A and the circuit terminal 133B and a voltage E between the circuit terminals 135A and 135B. In other words, the semiconductor switch 130A is subjected to ON/OFF control to cause the voltage E between the circuit terminals 135A and 135B described above to be constant. It is to be noted that the semiconductor switch 131A is kept off to operate as a freewheeling diode.

According to the configuration illustrated in FIG. 14, the semiconductor switch 130A is turned on to apply the whole of the voltage V of the unillustrated DC power supply to the reactor 129. This causes the reactor 129 to have more ripple currents, causes the reactor 129 to have more loss, and increases the reactor 129 in size. In other words, once the semiconductor switch 130A is switched, the smoothing capacitor 132 is charged with the energy passing through the diode 131D. In this case, the reactor 129 receives the whole voltage described as V. This raises an issue about an increase in the size of the reactor 129. In addition, the semiconductor switch 130A is switched by using the voltage of E. This raises an issue that the semiconductor switch has more loss.

FIG. 15 is a diagram illustrating an example of a configuration of a different conventional chopper circuit 200 capable of a bidirectional operation. In FIG. 15, the chopper circuit 200 includes a reactor 201 and semiconductor switches 202A, 202B, 203A, and 203B. The semiconductor switches 202A, 202B, 203A, and 203B each include an IGBT or the like. In addition, the chopper circuit 200 includes diodes 202AD, 202BD, 203AD, and 203BD that are respectively connected in antiparallel with the semiconductor switches 202A, 202B, 203A, and 203B. In addition, the chopper circuit 200 includes smoothing capacitors 204A and 204B each having a DC voltage of E/2.

In FIG. 15, the smoothing capacitor 204A and the smoothing capacitor 204B are connected in series. A circuit in which the semiconductor switch 202A and the semiconductor switch 203A are connected in series is then connected to both ends of the smoothing capacitor 204A. The connection point between the semiconductor switch 202A and the semiconductor switch 203A is connected to a terminal 201a of the reactor 201. In addition, a circuit in which the semiconductor switch 202B and the semiconductor switch 203B are connected in series is connected to both ends of the smoothing capacitor 204B. The connection point between the semiconductor switch 202B and the semiconductor switch 203B is connected to a terminal 201b of the reactor 201. It is to be noted that reference numeral 205 denotes a neutral point. In addition, circuit terminals 206A and 206B are connected to terminals 201c and 201d of the reactor 201. Circuit terminals 207A and 207B are connected to the terminals on both sides of the smoothing capacitors 204A and 204B connected in series.

According to the configuration illustrated in FIG. 15, the semiconductor switches apply the voltage difference between V serving as a power supply voltage and E/2 serving as a capacitor voltage to the reactor 201. This allows the reactor 201 to be decreased in size. In addition, each of the semiconductor switches is switched by using the voltage of E/2. This allows the semiconductor switch to have less loss. However, a current inevitably passes through two semiconductor switches. This raises an issue that the semiconductor switches have more conduction loss.

In addition, according to the configuration illustrated in FIG. 15, for example, the semiconductor switch 202A and the semiconductor switch 202B are alternately switched in the step-up mode and the semiconductor switches 203A and 203B are alternately switched in the step-down mode. This causes the reactor 201 to have less ripple currents and allows the reactor 201 to be decreased in size. The potential of a power supply V, however, fluctuates (the potential varies) with respect to the potential (virtual ground potential) at the neutral point 205 of the capacitor voltages because of the presence of semiconductor switches on the upper side and the lower side. This raises an issue about an increase in noise.

FIG. 16 is a diagram illustrating an example of a configuration of a DC power converter 210 including the conventional chopper circuit 200 illustrated in FIG. 15. In FIG. 16, the DC power converter 210 includes the chopper circuit 200, the smoothing capacitors 204A and 204B, the neutral point (virtual ground) 205, a battery 211, stray capacitances 214A and 214B, and an intermediate potential 215 of the battery 211.

The stray capacitances 214A and 214B are present, for example, between the battery 211 such as a storage battery or a solar cell and the ground. In the case of the configuration illustrated in FIG. 16, the switching of the chopper circuit 200 causes a difference between the potential of the virtual ground 205 of the smoothing capacitors 204A and 204B and the intermediate potential 215 of the battery 211. This causes a leakage current to flow through the stray capacitances 214A and 214B and the ground. The configuration illustrated in FIG. 16 may therefore have a noise problem. It is to be noted that the battery 211 such as a solar cell typically has large rated capacitance and the stray capacitances 214A and 214B are also large. This raises an issue about an increase in the influence of the noise problem.

It is therefore conceivable to switch the semiconductor switch 202A and the semiconductor switch 202B or 203B at the same time and fix the potential of the power supply V in the configuration illustrated, for example, in FIG. 15 (FIG. 16) to suppress an increase in noise. In this case, however, the reactor 201 is increased in size as in the configuration illustrated in FIG. 14.

FIG. 17 is a diagram illustrating an example of a configuration of a DC power converter 300 including a different conventional chopper circuit 301 capable of a bidirectional operation. In FIG. 17, the DC power converter 300 includes the chopper circuit 301, four power semiconductor devices 303Q, 304Q, 305Q, and 306Q, a capacitor 313, a capacitor 316, and a reactor 321. In the chopper circuit 301, the source of the power semiconductor device 303Q and the drain of the power semiconductor device 304Q are connected at a connection point 300b. In addition, in the chopper circuit 301, the source of the power semiconductor device 305Q and the drain of the power semiconductor device 306Q are connected at a connection point 300c. The chopper circuit 301 then includes a capacitor 323 between the connection point 300b and the connection point 300c. The capacitor 323 functions as a flyback capacitor.

The chopper circuit 301 illustrated in FIG. 17 allows the reactor 321 to be decreased in size because a high-frequency ripple current that flows in the reactor 321 is considerably suppressed, for example, at an about twofold boost ratio. The chopper circuit 301 is therefore a circuit system that is effective, for example, for an operation of an about twofold step-up at a conduction ratio of 50%. In other words, the chopper circuit 301 is provided with the capacitor 323 as illustrated in FIG. 17 and configured to apply the voltage difference between the capacitor 316 and the capacitor 323 to the reactor 321. This allows the reactor 321 to be decreased in size. The configuration illustrated in FIG. 17, however, requests the dedicated capacitor 323 and raises an issue about an increase in the size of the capacitor 323. In addition, in the configuration illustrated in FIG. 17, a current inevitably passes through two power semiconductor devices (semiconductor switches). This raises an issue that the semiconductor switches have more loss.

Accordingly, an object of the present disclosure is to provide a DC power converter that makes it possible to cause a reactor to have reduced ripple currents, decrease the reactor in size, cause a semiconductor switch to have less loss and cost less, and achieve lower noise as compared with a conventional DC power converter.

Means for Solving the Problems

A DC power converter according to an aspect includes a chopper circuit including a first switch that is connected in series between a first connection point and a second connection point, a first diode that is connected in antiparallel with the first switch, a second switch that is connected in series between the first connection point and a third connection point, a second diode that is connected in antiparallel with the second switch, a first capacitor that is connected in series between the second connection point and the third connection point, a second capacitor that is connected in series between the third connection point and a fourth connection point, and a DC power supply and a first reactor that are connected in series in order between the fourth connection point and the first connection point. In a step-up mode, in the chopper circuit, a current path that starts from the DC power supply and returns to the DC power supply through the first reactor, the first connection point, the second switch, the third connection point, the second capacitor, and the fourth connection point in order is formed when the first switch is off and the second switch is on, and a current path that starts from DC power supply and returns to the DC power supply through the first reactor, the first connection point, the first diode, the second connection point, the first capacitor, the third connection point, the second capacitor, and the fourth connection point in order is formed when the first switch is off and the second switch is off. In a step-down mode, in the chopper circuit, a current path that starts from the second capacitor and returns to the second capacitor through the third connection point, the first capacitor, the second connection point, the first switch, the first connection point, the first reactor, the DC power supply, and the fourth connection point in order is formed when the first switch is on and the second switch is off, and a current path that starts from the second capacitor and returns to the second capacitor through the third connection point, the second diode, the first connection point, the first reactor, the DC power supply, and the fourth connection point in order is formed when the first switch is off and the second switch is off.

A DC power converter according to another aspect includes a chopper circuit including a first diode that is connected in series between a first connection point and a second connection point, a second switch that is connected in series between the first connection point and a third connection point, a second diode that is connected in antiparallel with the second switch, a first capacitor that is connected in series between the second connection point and the third connection point, a second capacitor that is connected in series between the third connection point and a fourth connection point, and a DC power supply and a first reactor that are connected in series in order between the fourth connection point and the first connection point. In a step-up mode, in the chopper circuit, a current path that starts from the DC power supply and returns to the DC power supply through the first reactor, the first connection point, the second switch, the third connection point, the second capacitor, and the fourth connection point in order is formed when the second switch is on, and a current path that starts from the DC power supply and returns to the DC power supply through the first reactor, the first connection point, the first diode, the second connection point, the first capacitor, the third connection point, the second capacitor, and the fourth connection point in order is formed when the second switch is off.

A DC power converter according to another aspect includes a chopper circuit including a first switch that is connected in series between a first connection point and a second connection point, a first diode that is connected in antiparallel with the first switch, a second diode that is connected in series between the first connection point and a third connection point, a first capacitor that is connected in series between the second connection point and the third connection point, a second capacitor that is connected in series between the third connection point and a fourth connection point, and a DC power supply and a first reactor that are connected in series in order between the fourth connection point and the first connection point. In a step-down mode, in the chopper circuit, a current path that starts from the second capacitor and returns to the second capacitor through the third connection point, the first capacitor, the second connection point, the first switch, the first connection point, the first reactor, the DC power supply, and the fourth connection point in order is formed when the first switch is on, and a current path that starts from the second capacitor and returns to the second capacitor through the third connection point, the second diode, the first connection point, the first reactor, the DC power supply, and the fourth connection point in order is formed when the first switch is off.

Advantageous Effects of the Invention

According to the present disclosure, it is possible to provide a lower-noise DC power converter that makes it possible to cause a reactor to have reduced ripple currents, decrease the reactor in size, and cause a semiconductor switch to have less loss and cost less as compared with a conventional DC power converter.

BRIEF DESCRIPTION OF THE DRAWINGS

FIG. 4 is a diagram illustrating an example of a configuration of a control device in the DC power converter illustrated in FIGS. 1 to 3 and a control scheme in the step-up mode.

FIG. 5 is a diagram illustrating an example of the configuration of the control device in the DC power converter illustrated in FIGS. 1 to 3 and a control scheme in the step-down mode.

FIG. 8A and FIG. 8B are diagrams illustrating a flow of a current at time of transfer of energy of the first capacitor to the second capacitor in the chopper circuit illustrated in FIG. 6.

FIG. 9 is a diagram illustrating an example of a configuration of a control device in the DC power converter illustrated in FIGS. 6 to 8 and a control scheme in which voltage balance is controlled between the first capacitor and the second capacitor.

DESCRIPTION OF EMBODIMENTS

The following describes embodiments of a DC power converter according to the present disclosure with reference to the drawings.

First Embodiment

Figure 1:
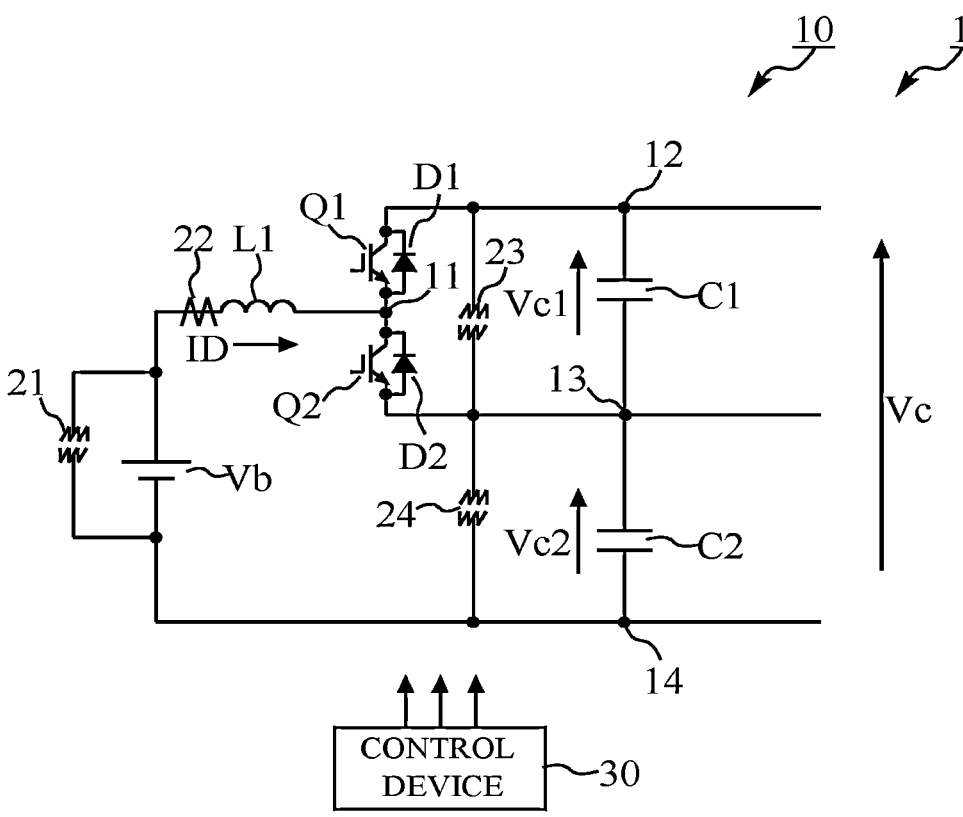
FIG. 1 is a diagram illustrating an example of a configuration of a DC power converter according to a first embodiment.

FIG. 1 is a diagram illustrating an example of a configuration of a DC power converter 1 according to a first embodiment.

As illustrated in FIG. 1, the DC power converter 1 includes a chopper circuit 10 and a control device 30 (controller 30). The DC power converter 1 is also referred to as a "DC DC converter (DC (Direct Current)/DC converter)" or the like. The DC power converter 1 is, for example, a power supply device that generates a DC voltage from a DC power supply which outputs a predetermined voltage. The generated DC voltage is a voltage different from the voltage output from the DC power supply.

The chopper circuit 10 is also referred to as a DC chopper. For example, the chopper circuit 10 changes a DC voltage by repeatedly turning on and off a semiconductor switching element. It is to be noted that the chopper circuit 10 according to the present embodiment is a step-up/step-down chopper capable of both a step-up of making an output DC voltage higher than an input DC voltage and a step-down of making an output DC voltage lower than an input DC voltage.

The chopper circuit 10 includes a DC power supply Vb, a first reactor L1, a first semiconductor switch Q1, a second semiconductor switch Q2, a first diode D1, a second diode D2, a first capacitor C1, and a second capacitor C2. In addition, these components of the chopper circuit 10 are connected to each other through a first connection point 11, a second connection point 12, a third connection point 13, and a fourth connection point 14.

In other words, the first capacitor C1 and the second capacitor C2 are connected in series through the third connection point 13. The first semiconductor switch Q1 and the second semiconductor switch Q2 are connected in series through the first connection point 11. The first semiconductor switch Q1 and the second semiconductor switch Q2 connected in series are then connected to both ends of the first capacitor C1 through the second connection point 12 and the third connection point 13 at both ends of the first capacitor C1. The first connection point 11 that is the connection point between the first semiconductor switch Q1 and the second semiconductor switch Q2 and one of the ends of the first reactor L1 are then connected and the chopper end of the first reactor L1 and one of the ends of the DC power supply Vb are connected. The other end of the DC power supply Vb is then connected to the second capacitor C2 through the fourth connection point 14. It is to be noted that the first diode D1 is connected in antiparallel with the first semiconductor switch Q1 and the second diode D2 is connected in antiparallel with the second semiconductor switch Q2.

The DC power supply Vb is, for example, a storage battery (battery) or the like. The DC power supply Vb is connected in series between the fourth connection point 14 and the first reactor L1. When the chopper circuit 10 (DC power converter 1) is in the step-up mode, the DC power supply Vb discharges power to the first capacitor C1 and the second capacitor C2. When the chopper circuit 10 (DC power converter 1) is in the step-down mode, the DC power supply Vb is charged with power received from the first capacitor C1 and the second capacitor C2.

The first reactor L1 is connected in series in order between the DC power supply Vb and the first connection point 11. For example, when the chopper circuit 10 (DC power converter 1) is in the step-up mode, the first reactor L1 accumulates the energy of power supplied from the DC power supply Vb and steps up the first capacitor C1 and the second capacitor C2 by using the accumulated energy.

The first semiconductor switch Q1 is connected between the first connection point 11 and the second connection point 12 and the second semiconductor switch Q2 is connected between the first connection point 11 and the third connection point 13. The first semiconductor switch Q1 and the second semiconductor switch Q2 are semiconductor switching elements each including, for example, an IGBT or the like. The first semiconductor switch Q1 and the second semiconductor switch Q2 are switched, for example, on the basis of a chopper duty or the like corresponding to an output voltage/output current or the like. ON/OFF operations of the first semiconductor switch Q1 and the second semiconductor switch Q2 are each controlled, for example, on the basis of a gate driving signal (gate signal) output from the control device 30. It is to be noted that the chopper duty is, for example, the ON/OFF time ratio between the semiconductor switching elements. The chopper duty is also referred to as an "on-duty", a "duty ratio", or the like. It is to be noted that the first semiconductor switch Q1 is an example of a "first switch" and the second semiconductor switch Q2 is an example of a "second switch".

The first diode D1 is connected in antiparallel with the first semiconductor switch Q1 and the second diode D2 is connected in antiparallel with the second semiconductor switch Q2. The first diode D1 and the second diode D2 are freewheeling diodes that each transfer energy back to the DC power supply Vb side, for example, when the IGBT is turned off.

The first capacitor C1 is connected in series between the second connection point 12 and the third connection point 13 and the second capacitor C2 is connected in series between the third connection point 13 and the fourth connection point 14. The first capacitor C1 and the second capacitor C2 are DC smoothing capacitors that each smooth a voltage fluctuation (ripple). When the chopper circuit 10 (DC power converter 1) is in the step-up mode, the first capacitor C1 and the second capacitor C2 are each charged with power received from the DC power supply Vb. When the chopper circuit 10 (DC power converter 1) is in the step-down mode, the first capacitor C1 and the second capacitor C2 each discharge power to the DC power supply Vb.

In addition, a first voltage sensor 21, a first current sensor 22, a second voltage sensor 23, and a third voltage sensor 24 are placed in the DC power converter 1. It is to be noted that the positions at which the first voltage sensor 21, the first current sensor 22, the second voltage sensor 23, and the third voltage sensor 24 are placed are not limited to the positions illustrated in FIG. 1. These sensors may be placed at any positions as long as the positions allow the sensors to obtain the values of currents or voltages to be obtained. It is to be noted that FIG. 2 and the subsequent diagrams will omit these sensors as appropriate.

The first voltage sensor 21 is placed at a position that allows the first voltage sensor 21, for example, to detect the voltage across the DC power supply Vb. The first voltage sensor 21 constantly detects the value of a voltage VVb of the DC power supply Vb. The value of the voltage VVb of the DC power supply Vb detected by the first voltage sensor 21 is obtained (monitored) by the control device 30.

The first current sensor 22 is placed at a position that allows the first current sensor 22, for example, to detect a current flowing to the first reactor L1. The first current sensor 22 constantly detects the value of a current ID flowing to the first reactor L1. The value of the current ID flowing to the first reactor L1 detected by the first current sensor 22 is obtained (monitored) by the control device 30.

The second voltage sensor 23 is placed at a position that allows the second voltage sensor 23, for example, to detect the voltage of the first capacitor C1. The second voltage sensor 23 constantly detects the value of a voltage VC1 of the first capacitor C1. The value of the voltage VC1 of the first capacitor C1 detected by the second voltage sensor 23 is obtained (monitored) by the control device 30.

The third voltage sensor 24 is placed at a position that allows the third voltage sensor 24, for example, to detect the voltage of the second capacitor C2. The third voltage sensor 24 constantly detects the value of a voltage VC2 of the second capacitor C2. The value of the voltage VC2 of the second capacitor C2 detected by the third voltage sensor 24 is obtained (monitored) by the control device 30.

The control device 30 includes, for example, a processor 91 (see FIG. 13) such as a CPU (Central Processing Unit) that is operated by executing a program. The processor 91 will be described below. The control device 30 includes a memory 92 (see FIG. 13) described below. The control device 30 integrally controls an operation of the DC power converter 1 (chopper circuit 10), for example, by executing a predetermined program stored in the memory 92 to bring the processor 91 into operation. It is to be noted that the control device 30 may be operated, for example, in accordance with an instruction received from an operator or the like through an unillustrated higher-level device or an unillustrated operation section. The control device 30 is connected to each of sections of the DC power converter 1 through an unillustrated signal line or the like. The control device 30 controls operations of the first semiconductor switch Q1 and the second semiconductor switch Q2, for example, on the basis of the values of currents and voltages and the like obtained from the first voltage sensor 21, the first current sensor 22, the second voltage sensor 23, and the third voltage sensor 24. It is to be noted that a detailed configuration and a control scheme (operation) of the control device 30 will be described below (see FIGS. 4 and 5 and other diagrams).

Figures 2A, 2B:
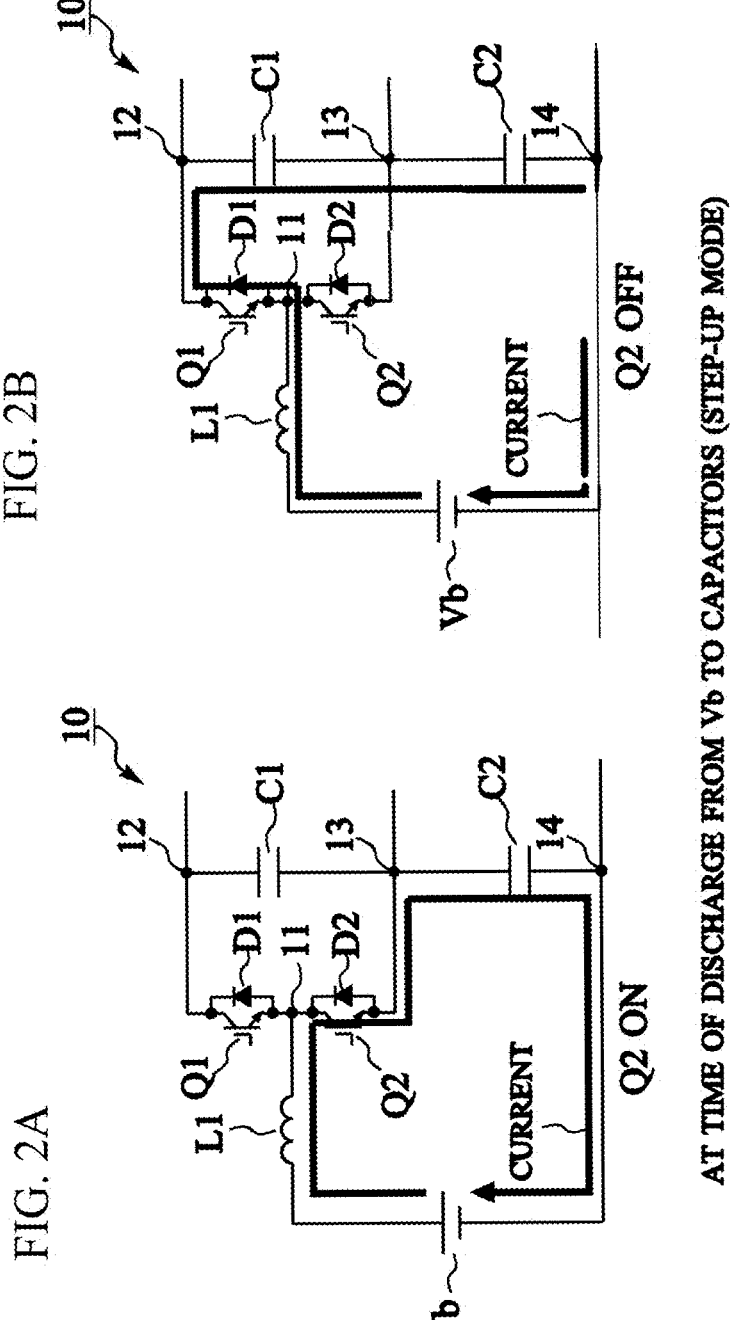
FIG. 2A and FIG. 2B are diagrams illustrating a flow of a current in a chopper circuit illustrated in FIG. 1 in a case of a step-up mode.

FIG. 2A and FIG. 2B are diagrams diagram illustrating the flow of a current in the chopper circuit 10 illustrated in FIG. 1 in the case of the step-up mode. FIG. 2A is a diagram illustrating the flow of a current in the chopper circuit 10 illustrated in FIG. 1 in which the second semiconductor switch Q2 is on in the case of the step-up mode. FIG. 2B is a diagram illustrating the flow of a current in the chopper circuit 10 illustrated in FIG. 1 in which the second semiconductor switch Q2 is off in the case of the step-up mode.

As illustrated in FIG. 2A, in a case where the chopper circuit 10 (DC power converter 1) is in the step-up mode, the following current path is formed in the chopper circuit 10 when the first semiconductor switch Q1 is off and the second semiconductor switch Q2 is on. In other words, a current path is formed that starts from DC power supply Vb and returns to the DC power supply Vb through the first reactor L1, the first connection point 11, the second semiconductor switch Q2, the third connection point 13, the second capacitor C2, and the fourth connection point 14 in order.

In contrast, as illustrated in FIG. 2(b), in a case where the chopper circuit 10 (DC power converter 1) is in the step-up mode, the following current path is formed in the chopper circuit 10 when the first semiconductor switch Q1 is off and the second semiconductor switch Q2 is off. In other words, a current path is formed that starts from DC power supply Vb and returns to the DC power supply Vb through the first reactor L1, the first connection point 11, the first diode D1, the second connection point 12, the first capacitor C1, the third connection point 13, the second capacitor C2, and the fourth connection point 14 in order.

Figures 3A, 3B:
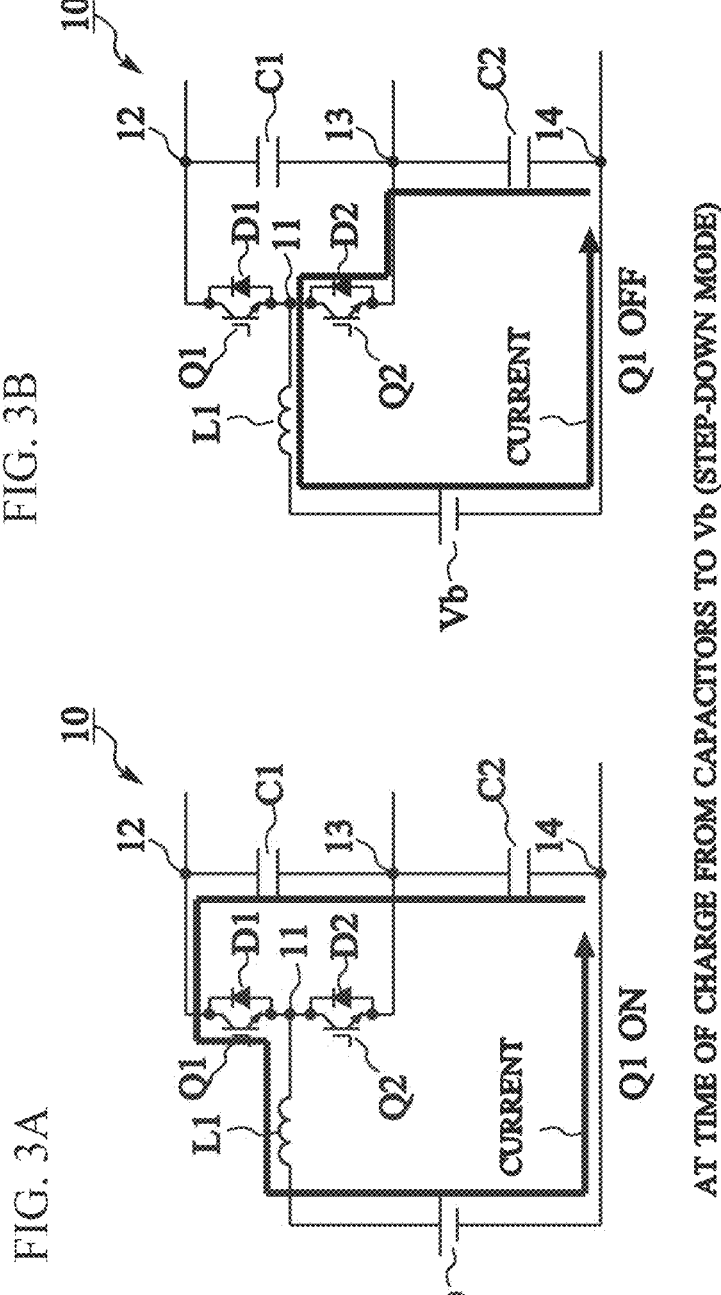
FIG. 3A and FIG. 3B are diagrams illustrating a flow of a current in the chopper circuit illustrated in FIG. 1 in a case of a step-down mode.

FIG. 3A and FIG. 3B are diagrams illustrating the flow of a current in the chopper circuit 10 illustrated in FIG. 1 in the case of the step-down mode. FIG. 3A is a diagram illustrating the flow of a current in the chopper circuit 10 illustrated in FIG. 1 in which the first semiconductor switch Q1 is on in the case of the step-down mode. FIG. 3B is a diagram illustrating the flow of a current in the chopper circuit 10 illustrated in FIG. 1 in which the first semiconductor switch Q1 is off in the case of the step-down mode.

As illustrated in FIG. 3A, in a case where the chopper circuit 10 (DC power converter 1) is in the step-down mode, the following current path is formed in the chopper circuit 10 when the first semiconductor switch Q1 is on and the second semiconductor switch Q2 is off. In other words, a current path is formed that starts from the second capacitor C2 and returns to the second capacitor C2 through the third connection point 13, the first capacitor C1, the second connection point 12, the first semiconductor switch Q1, the first connection point 11, the first reactor L1, the DC power supply Vb, and the fourth connection point 14 in order.

In contrast, as illustrated in FIG. 3(b), in a case where the chopper circuit 10 (DC power converter 1) is in the step-down mode, the following current path is formed in the chopper circuit 10 when the first semiconductor switch Q1 is off and the second semiconductor switch Q2 is off. In other words, a current path is formed that starts from the second capacitor C2 and returns to the second capacitor C2 through the third connection point 13, the second diode D2, the first connection point 11, the first reactor L1, the DC power supply Vb, and the fourth connection point 14 in order.

<Control Schemes According to First Embodiment>

FIG. 4 is a diagram illustrating an example of a configuration of the control device 30 in the DC power converter 1 illustrated in FIGS. 1 to 3 and a control scheme in the step-up mode.

The control device 30 includes the memory 92 (see FIG. 13) described below. The control device 30 functions as the following respective sections, for example, by executing predetermined programs stored in the memory 92 described below. In other words, the control device 30 functions as a first subtractor 31, a voltage controller 32, a second subtractor 33, a current controller 34, and a PWM (Pulse Width Modulation) control section 35 by executing the predetermined programs. It is to be noted that each of the functions described above may be implemented by a program to be executed by the processor 91 (see FIG. 13) included in the control device 30 or implemented by hardware 93 (see FIG. 13). Each of the sections described above performs the following processing in the step-up mode by executing a predetermined program.

The first subtractor 31 obtains a VC reference, for example, from the memory 92 (see FIG. 13) described below. Here, the VC reference is a predetermined voltage reference value (voltage command value) for controlling the value of a voltage VC to be a predetermined value or a constant value. The voltage VC is obtained by adding the value of the voltage VC1 of the first capacitor C1 and the value of the voltage VC2 of the second capacitor C2 together. It is to be noted that the first subtractor 31 may calculate the VC reference, for example, on the basis of a predetermined calculation or the like or obtain the VC reference by receiving an instruction from an unillustrated higher-level device, an unillustrated operator, or the like.

In addition, the first subtractor 31 obtains the value of the voltage VC1 of the first capacitor C1 from the second voltage sensor 23 (see FIG. 1) and obtains the value of the voltage VC2 of the second capacitor C2 from the third voltage sensor 24 (see FIG. 1) (the value is fed back). Alternatively, the first subtractor 31 obtains the value of the voltage VC corresponding to the value of the voltage VC1 of the first capacitor C1+the value of the voltage VC2 of the second capacitor C2 from the second voltage sensor 23 and the third voltage sensor 24 (the value is fed back). The first subtractor 31 then subtracts the obtained value of the voltage VC (or the value of the voltage VC1+VC2) from the obtained (or calculated) VC reference and outputs the value resulting from the subtraction to the voltage controller 32.

The voltage controller 32 performs, for example, PI (Proportional-Integral: proportional-integral) control or the like on the value obtained from the first subtractor 31 to obtain an ID reference. Here, the ID reference is a reference value (current command value) of a current to be applied to the first reactor L1 for controlling the value of the voltage VC to be a predetermined value or a constant value. The voltage VC is obtained by adding the value of the voltage VC1 of the first capacitor C1 and the value of the voltage VC2 of the second capacitor C2 together. The voltage controller 32 outputs the obtained ID reference to the second subtractor 33. It is to be noted that the first subtractor 31 and the voltage controller 32 are examples of a "voltage control section", the VC reference is an example of a "first voltage command value", and the ID reference is an example of a "first current command value".

The second subtractor 33 obtains the ID reference from the voltage controller 32. In addition, the second subtractor 33 obtains the value of the current ID flowing to the first reactor L1 from the first current sensor 22 (see FIG. 1) (the value is fed back). The second subtractor 33 then subtracts the obtained value of the current ID from the obtained ID reference and outputs the value resulting from the subtraction to the current controller 34.

The current controller 34 performs, for example, PI control or the like on the value obtained from the second subtractor 33 to obtain a voltage command value V1* that is a duty command (chopper duty) of the step-up mode. The current controller 34 outputs the obtained voltage command value V1* to the PWM control section 35. It is to be noted that the second subtractor 33 and the current controller 34 are examples of a "current control section" and the voltage command value V1* is an example of a "second voltage command value".

The PWM control section 35 performs PWM control on the basis of the voltage command value V1* obtained from the current controller 34 and, for example, a predetermined triangular wave carrier signal to generate a gate signal that is a pulse width modulation (PWM) signal for controlling an operation of the second semiconductor switch Q2. The PWM control section 35 outputs the generated gate signal (Q2 pulse) to the second semiconductor switch Q2 and controls an ON/OFF operation of the second semiconductor switch Q2. It is to be noted that the Q2 pulse is an example of a "first pulse".

In a case where the DC power converter 1 (chopper circuit 10) is in the step-up mode, controlling an ON/OFF operation of the second semiconductor switch Q2 in accordance with the control scheme described above makes it possible to charge the first capacitor C1 and the second capacitor C2 from the DC power supply Vb and step up the first capacitor C1 and the second capacitor C2.

Figure 5:
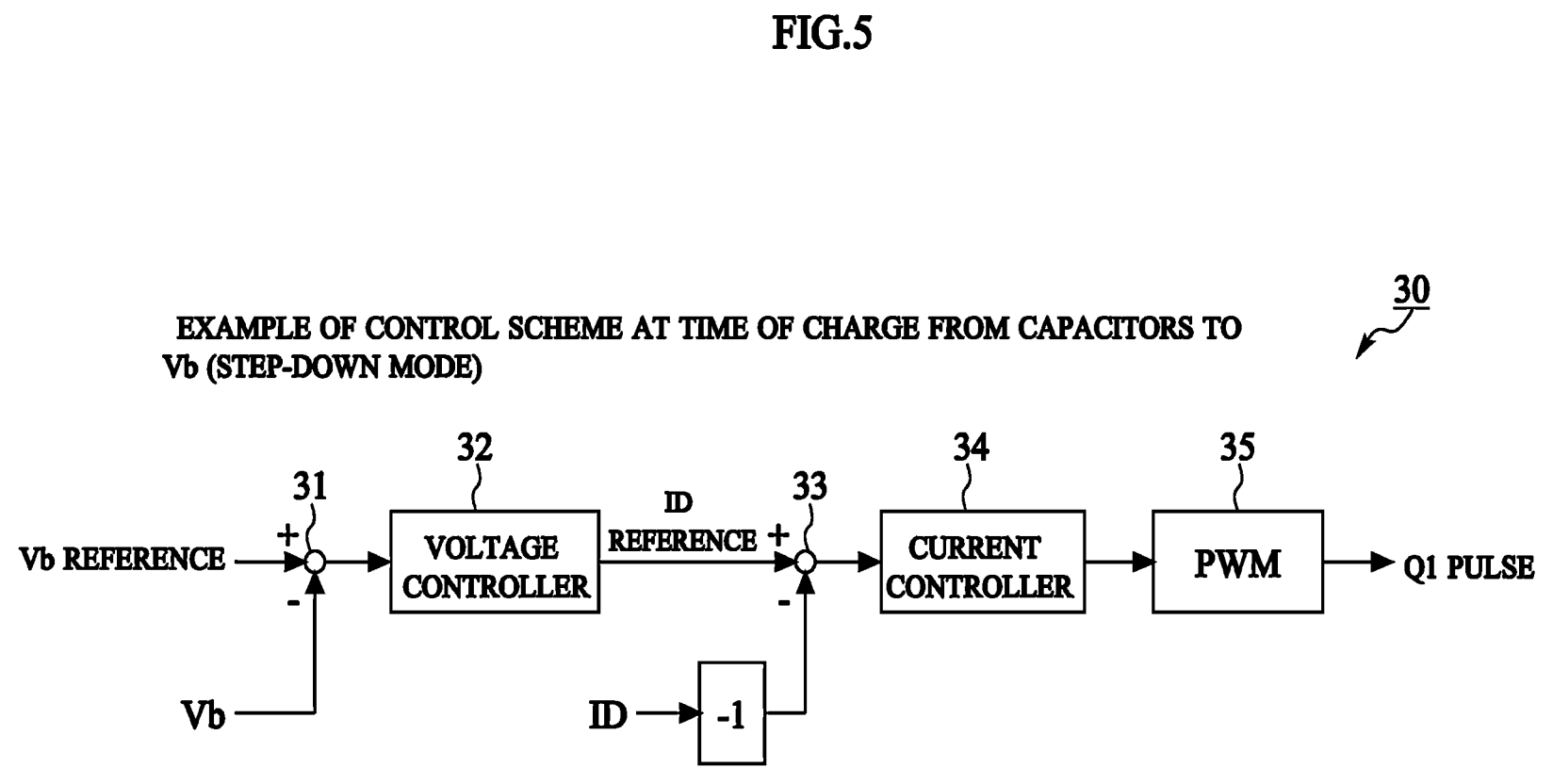

FIG. 5 is a diagram illustrating an example of the configuration of the control device 30 in the DC power converter 1 illustrated in FIGS. 1 to 3 and a control scheme in the step-down mode.

As described above, the control device 30 functions as the first subtractor 31, the voltage controller 32, the second subtractor 33, the current controller 34, and the PWM control section 35 by executing the predetermined programs. Each of the sections described above performs the following processing in the step-down mode by executing a predetermined program.

The first subtractor 31 obtains a Vb reference, for example, from the memory 92 (see FIG. 13) described below. Here, the Vb reference is a predetermined voltage reference value (voltage command value) for controlling the value of the voltage VVb of the DC power supply Vb to be a predetermined value or a constant value. For example, the Vb reference is a voltage reference value (voltage command value) indicating at what volts the value of the voltage VVb of the DC power supply (battery) Vb is to be set, for example, such as 500 volts. It is to be noted that the first subtractor 31 may calculate the Vb reference, for example, on the basis of a predetermined calculation or the like or obtain the Vb reference by receiving an instruction from an unillustrated higher-level device, an unillustrated operator, or the like.

In addition, the first subtractor 31 obtains the value of the voltage VVb of the DC power supply Vb from the first voltage sensor 21 (see FIG. 1) (the value is fed back). The first subtractor 31 then subtracts the obtained value of the voltage VVb from the obtained (or calculated) Vb reference and outputs the value resulting from the subtraction to the voltage controller 32.

The voltage controller 32 performs, for example, PI control or the like on the value obtained from the first subtractor 31 to obtain the ID reference. The ID reference here is a reference value (current command value) of a current to be applied to the first reactor L1 for controlling the value of the voltage VVb of the DC power supply Vb to be a predetermined value or a constant value. The voltage controller 32 outputs the obtained ID reference to the second subtractor 33. It is to be noted that the Vb reference is an example of a "third voltage command value" and the ID reference here is an example of a "second current command value".

The second subtractor 33 obtains the ID reference from the voltage controller 32. In addition, the second subtractor 33 obtains the value obtained by multiplying the value of the current ID flowing from the first current sensor 22 (see FIG. 1) to the first reactor L1 by −1 (the value is fed back). Here, the value of the current ID is multiplied by −1 because the current direction in the case of the step-down mode is reverse to that of the step-up mode in polarity. In other words, the charging direction and the discharging direction have reverse current directions. The value of the current ID is thus multiplied by −1 to avoid inconsistency from the perspective of control. The second subtractor 33 then subtracts the value obtained by multiplying the obtained value of the current ID by −1 from the obtained ID reference and outputs the value resulting from the subtraction to the current controller 34.

The current controller 34 performs, for example, PI control or the like on the value obtained from the second subtractor 33 to obtain a voltage command value V2* that is a duty command (chopper duty) of the step-down mode. The current controller 34 outputs the obtained voltage command value V2* to the PWM control section 35. It is to be noted that the voltage command value V2* is an example of a "fourth voltage command value".

The PWM control section 35 performs PWM control on the basis of the voltage command value V2* obtained from the current controller 34 and, for example, a predetermined triangular wave carrier signal to generate a gate signal that is a pulse width modulation (PWM) signal for controlling an operation of the first semiconductor switch Q1. The PWM control section 35 outputs the generated gate signal (Q1 pulse) to the first semiconductor switch Q1 and controls an ON/OFF operation of the first semiconductor switch Q1. It is to be noted that the Q1 pulse is an example of a "second pulse".

In a case where the DC power converter 1 (chopper circuit 10) is in the step-down mode, controlling an ON/OFF operation of the first semiconductor switch Q1 in accordance with the control scheme described above makes it possible to charge the DC power supply Vb from the first capacitor C1 and the second capacitor C2 and step down the first capacitor C1 and the second capacitor C2.

<Workings and Effects of First Embodiment>

According to the first embodiment illustrated in FIGS. 1 to 5 described above, in the chopper circuit 10, a voltage applied to the first reactor L1 is the difference between the voltage VVb of the DC power supply Vb and the voltage VC2 of the second capacitor C2. This allows the first reactor L1 to have reduced ripple currents. This then allows the first reactor L1 to have lower loss and allows the first reactor L1 to be decreased in size. In other words, the first embodiment illustrated in FIGS. 1 to 5 allows the first reactor L1 to have reduced ripple currents and allows the first reactor L1 to be decreased in size as compared with the conventional technology.

In addition, according to the first embodiment illustrated in FIGS. 1 to 5, a current path passing through only any one of the first semiconductor switch Q1 and the second semiconductor switch Q2 is formed in the chopper circuit 10. In addition, the first semiconductor switch Q1 and the second semiconductor switch Q2 are switched within the voltage range of the voltage VC1 of the first capacitor C1. This allows the first semiconductor switch Q1 and the second semiconductor switch Q2 to have reduced switching loss. This makes it possible to apply inexpensive semiconductor switches each having a low rated voltage to the first semiconductor switch Q1 and the second semiconductor switch Q2. In other words, the first embodiment illustrated in FIGS. 1 to 5 allows the first semiconductor switch Q1 and the second semiconductor switch Q2 to have reduced loss and cost less as compared with the conventional technology.

Figure 16:
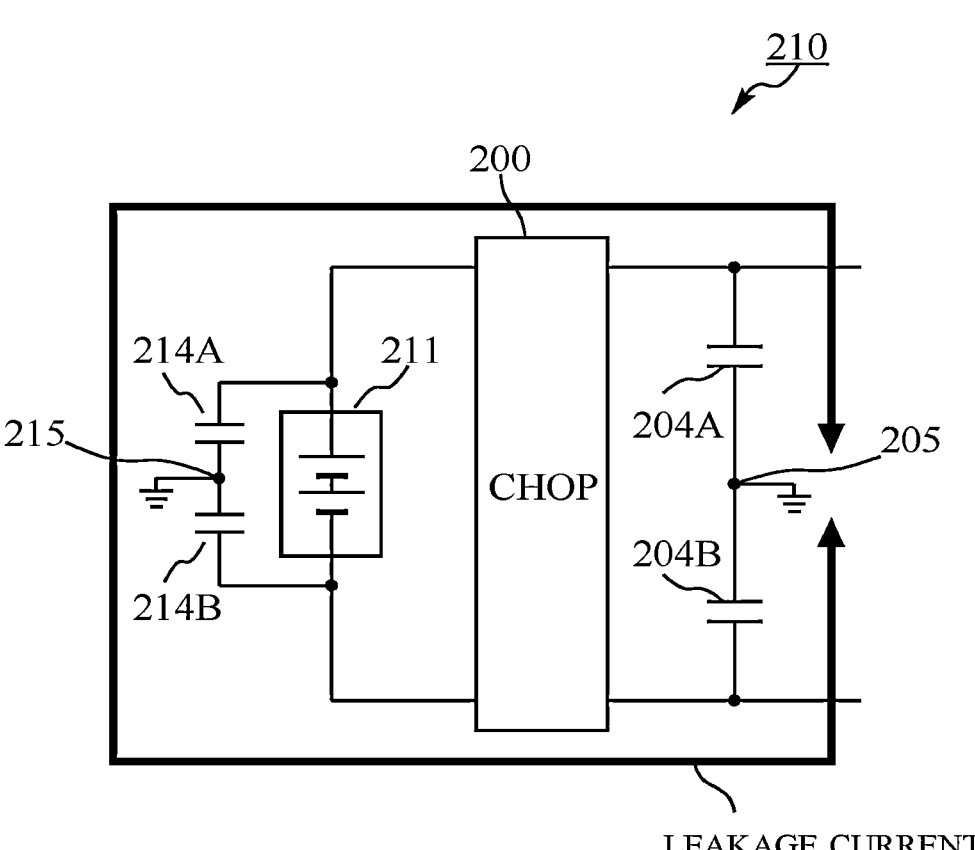
FIG. 16 is a diagram illustrating an example of a configuration of a DC power converter including the conventional chopper circuit illustrated in FIG. 15.
Figure 17:
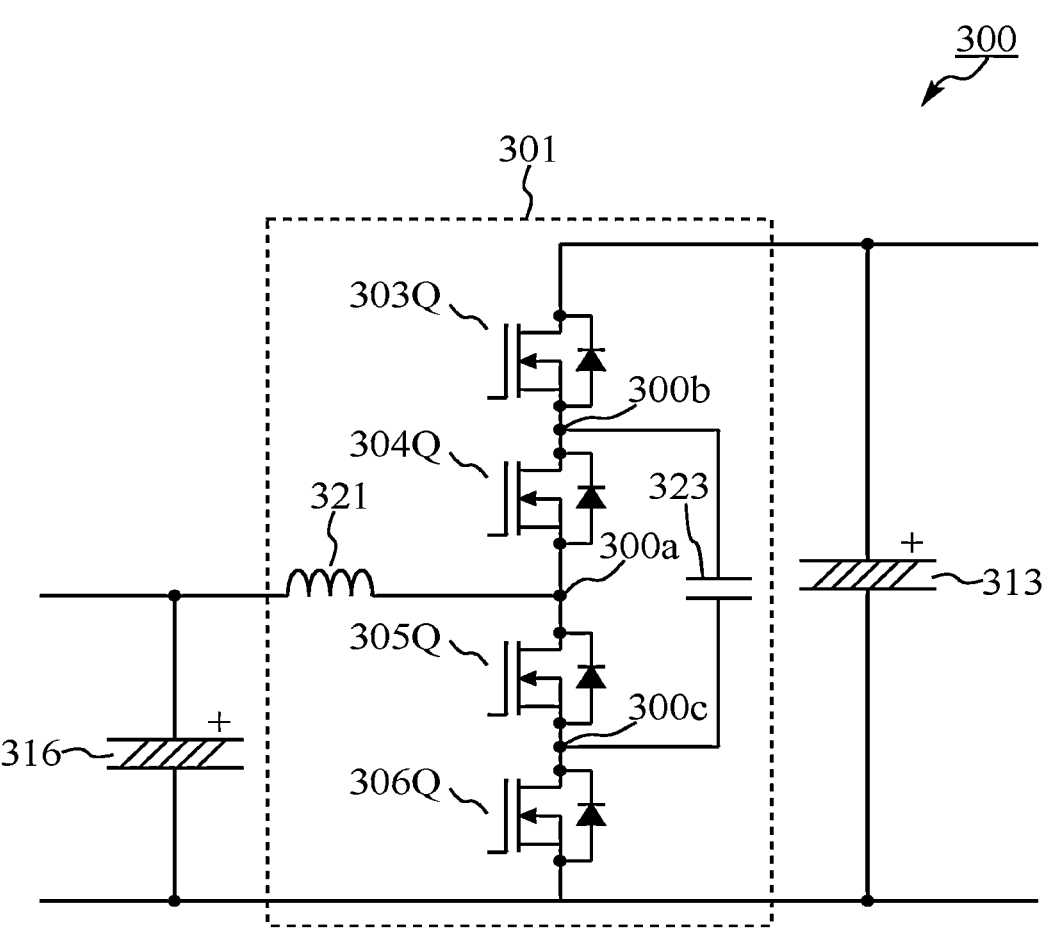
FIG. 17 is a diagram illustrating an example of a configuration of a DC power converter including a different conventional chopper circuit capable of a bidirectional operation.

In addition, according to the first embodiment illustrated in FIGS. 1 to 5, the negative electrode of a capacitor and the negative electrode of the DC power supply Vb are connected in the chopper circuit 10. This causes the DC power converter 1 (chopper circuit 10) and the DC power supply Vb to use the common negative electrode. The potential difference thus decreases and the leakage current decreases. This fixes the potential with respect to the ground and reduces the noise problem caused by the leakage current (see FIG. 16). It is thus possible to achieve low noise. In other words, the first embodiment illustrated in FIGS. 1 to 5 makes it possible to provide the DC power converter 1 (chopper circuit 10) that is lower in noise than the conventional DC power converter.

Second Embodiment

Figure 6:
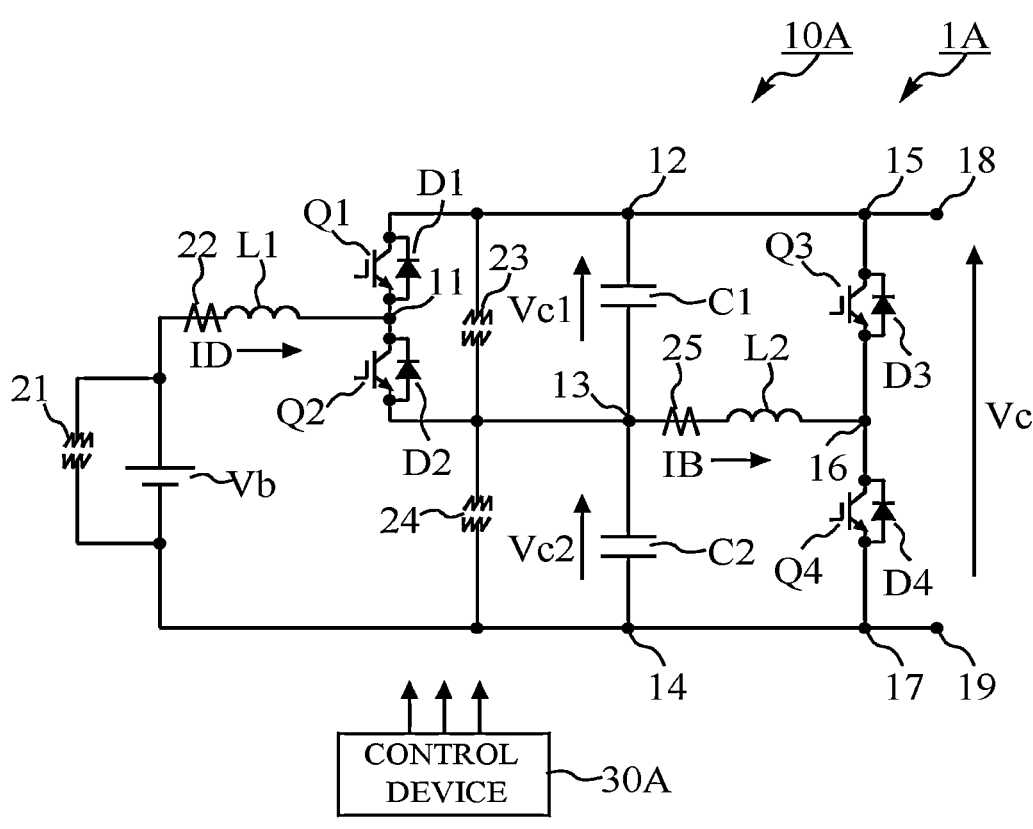
FIG. 6 is a diagram illustrating an example of a configuration of a DC power converter according to a second embodiment.

FIG. 6 is a diagram illustrating an example of a configuration of a DC power converter 1A according to a second embodiment. In the second embodiment, the components that are the same as or similar to the components according to the first embodiment illustrated in FIGS. 1 to 5 will be denoted by the same reference numerals. Duplicate description or detailed description will be thus omitted or simplified. The DC power converter 1A according to the second embodiment is obtained by adding a component for performing control to cause the first capacitor C1 and the second capacitor C2 to have even voltage balance to the DC power converter 1 illustrated in FIGS. 1 to 5.

As illustrated in FIG. 6, the DC power converter 1A includes a chopper circuit 10A and a control device 30A. The DC power converter 1A (chopper circuit 10A) includes the following components in addition to the components of the DC power converter 1 (chopper circuit 10) illustrated in FIG. 1. In other words, the DC power converter 1A (chopper circuit 10A) includes a third semiconductor switch Q3, a fourth semiconductor switch Q4, a third diode D3, a fourth diode D4, and a second reactor L2 in addition to the components illustrated in FIG. 1. These components of the chopper circuit 10A are then connected to each other through the second connection point 12, the third connection point 13, the fourth connection point 14, a fifth connection point 15, a sixth connection point 16, and a seventh connection point 17.

In other words, the third semiconductor switch Q3 and the fourth semiconductor switch Q4 are connected to both ends of the first capacitor C1 and the second capacitor C2 to add two pairs of semiconductor switches. The second reactor L2 is then connected between the sixth connection point 16 and the third connection point 13. The sixth connection point 16 is the connection point between the third semiconductor switch Q3 and the fourth semiconductor switch Q4. The third connection point 13 is the connection point between the first capacitor C1 and the second capacitor C2.

It is to be noted that the third diode D3 is connected in antiparallel with the third semiconductor switch Q3 and the fourth diode D4 is connected in antiparallel with the fourth semiconductor switch Q4. In addition, the fifth connection point is connected to a first terminal 18 on the right side in FIG. 6, the seventh connection point is connected to a second terminal 19 on the right side in FIG. 6, and, for example, an unillustrated load is connected between the first terminal 18 and the second terminal 19.

The third semiconductor switch Q3 is connected in series between the fifth connection point 15 between the second connection point 12 and the first terminal 18, and the sixth connection point 16. The fourth semiconductor switch Q4 is connected in series between the sixth connection point 16, and the seventh connection point 17 between the fourth connection point 14 and the second terminal 19. The third semiconductor switch Q3 and the fourth semiconductor switch Q4 are semiconductor switching elements each including, for example, an IGBT or the like. The third semiconductor switch Q3 and the fourth semiconductor switch Q4 are switched, for example, on the basis of the voltage difference between the voltage VC1 of the first capacitor C1 and the voltage VC2 of the second capacitor C2. ON/OFF operations of the third semiconductor switch Q3 and the fourth semiconductor switch Q4 are each controlled, for example, on the basis of a gate driving signal (gate signal) output from the control device 30A. It is to be noted that the third semiconductor switch Q3 is an example of a "third switch" and the fourth semiconductor switch Q4 is an example of a "fourth switch".

The third diode D3 is connected in antiparallel with the third semiconductor switch Q3 and the fourth diode D4 is connected in antiparallel with the fourth semiconductor switch Q4. The third diode D3 and the fourth diode D4 are freewheeling diodes that each transfer energy back to the first capacitor C1 side or the second capacitor C2 side, for example, when the IGBT is turned off.

The second reactor L2 is connected in series between the third connection point 13 and the sixth connection point 16. The second reactor L2 functions as a balancer for performing control to cause the voltage VC1 of the first capacitor C1 and the voltage VC2 of the second capacitor C2 to have constant or any voltage balance as described below (see FIGS. 7 and 8 and other diagrams).

For example, in the configuration according to the first embodiment illustrated in FIGS. 1 to 5, the first capacitor C1 and the second capacitor C2 have different charging/discharging energies. This sometimes causes the voltage VC1 of the first capacitor C1 and the voltage VC2 of the second capacitor C2 to have a voltage difference. For example, in the configuration according to the first embodiment illustrated in FIGS. 1 to 5, alternately switching the first semiconductor switch Q1 and the second semiconductor switch Q2 in the case of the step-up mode sometimes causes the second capacitor C2 to have a higher voltage than the voltage of the first capacitor C1. In this case, for example, in a case where the energies to be discharged are the same, the voltage VC1 of the first capacitor C1 and the voltage VC2 of the second capacitor C2 sometimes have a voltage difference.

Accordingly, in the second embodiment, the second reactor L2 is connected in series between the sixth connection point 16 and the third connection point 13 as illustrated in FIG. 6. This makes it possible to perform control to cause the voltage VC1 of the first capacitor C1 and the voltage VC2 of the second capacitor C2 to have any voltage balance by switching the third semiconductor switch Q3 and the fourth semiconductor switch Q4.

In addition, a second current sensor 25 is placed in the DC power converter 1A. It is to be noted that the position at which the second current sensor 25 is placed is not limited to the position illustrated in FIG. 6. The sensor may be placed at any position as long as the position allows the sensor to obtain the value of a current to be obtained. It is to be noted that FIG. 7 and the subsequent diagrams will omit the second current sensor 25 as appropriate.

The second current sensor 25 is placed at a position that allows the second current sensor 25, for example, to detect a current flowing to the second reactor L2. The second current sensor 25 constantly detects the value of a current IB flowing to the second reactor L2. The value of the current IB flowing to the second reactor L2 detected by the second current sensor 25 is obtained (monitored) by the control device 30A.

The control device 30A is connected to each of the sections of the DC power converter 1A through an unillustrated signal line or the like. The control device 30A has a function similar to that of the control device 30 according to the first embodiment illustrated in FIGS. 1 to 5. In other words, the control device 30A controls operations of the first semiconductor switch Q1 and the second semiconductor switch Q2 on the basis of the values of currents and voltages and the like obtained from the respective sensors and the like. In addition, the control device 30A further controls operations of the third semiconductor switch Q3 and the fourth semiconductor switch Q4 on the basis of the values of currents and voltages and the like obtained from the respective sensors and the like. It is to be noted that a detailed configuration and a control scheme (operation) of the control device 30A will be described below (see FIG. 9 and other diagrams).

Figure 7A:
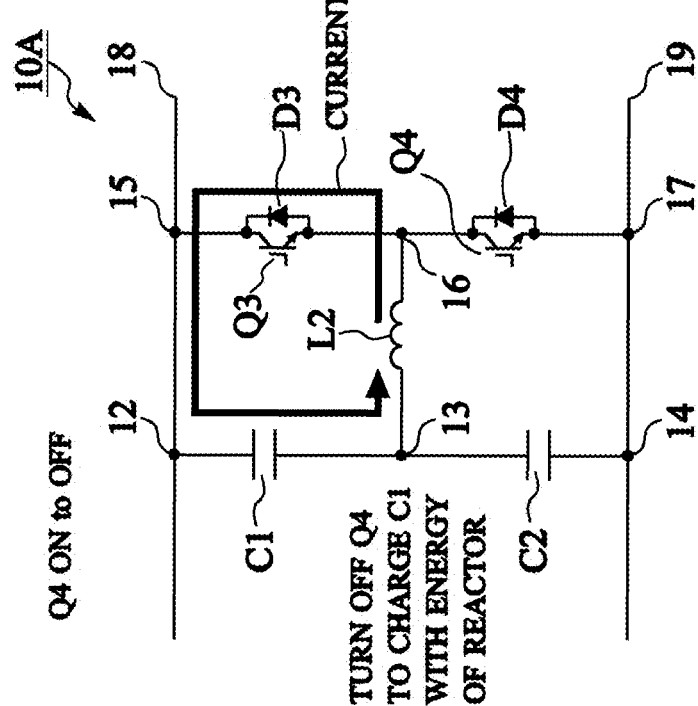
FIG. 7A and FIG. 7B are diagrams illustrating a flow of a current at time of transfer of energy of a second capacitor to a first capacitor in the chopper circuit illustrated in FIG. 6.
Figure 7B:
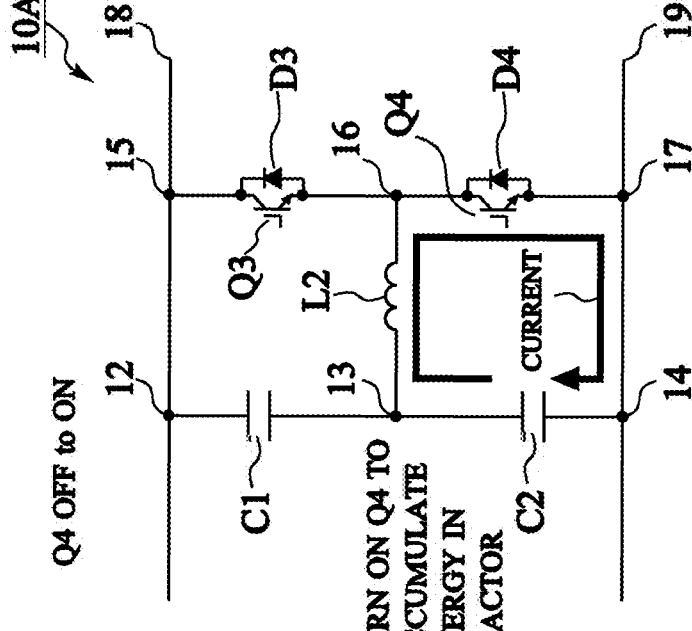

FIG. 7A and FIG. 7B are diagrams illustrating the flow of a current at time of the transfer of the energy of the second capacitor C2 to the first capacitor C1 in the chopper circuit 10A illustrated in FIG. 6. FIG. 7A is a diagram illustrating the flow of a current with the fourth semiconductor switch Q4 turned on in a case where the energy accumulated in the second capacitor C2 is greater than the energy accumulated in the first capacitor C1. FIG. 7B is a diagram illustrating the flow of a current with the fourth semiconductor switch Q4 turned off in a case where the energy accumulated in the second capacitor C2 is greater than the energy accumulated in the first capacitor C1.

As illustrated in FIG. 7A, in a case where the energy accumulated in the second capacitor C2 is greater than the energy accumulated in the first capacitor C1, the following current path is formed when the third semiconductor switch Q3 is turned off and the fourth semiconductor switch Q4 is turned on. In other words, a current path is formed that starts from the second capacitor C2 and returns to the second capacitor C2 through the third connection point 13, the second reactor L2, the sixth connection point 16, the fourth semiconductor switch Q4, the seventh connection point 17, and the fourth connection point 14 in order. This causes the energy accumulated in the second capacitor C2 to be accumulated in the second reactor L2.

As illustrated in FIG. 7(b), in this case, the following current path is then formed when the third semiconductor switch Q3 is turned off and the fourth semiconductor switch Q4 is turned off. In other words, a current path is formed that starts from the second reactor L2 and returns to the second reactor L2 through the sixth connection point 16, the third diode D3, the fifth connection point 15, the second connection point 12, the first capacitor C1, and the third connection point 13 in order. This causes the energy accumulated in the second reactor L2 to be accumulated in the first capacitor C1 and the first capacitor C1 is charged. This causes the voltage VC1 of the first capacitor C1 and the voltage VC2 of the second capacitor C2 to have balance (to be even).

FIG. 8A and FIG. 8B are diagrams illustrating the flow of a current at time of the transfer of the energy of the first capacitor C1 to the second capacitor C2 in the chopper circuit 10A illustrated in FIG. 6. FIG. 8A is a diagram illustrating the flow of a current with the third semiconductor switch Q3 turned on in a case where the energy accumulated in the first capacitor C1 is greater than the energy accumulated in the second capacitor C2. FIG. 8B is a diagram illustrating the flow of a current with the third semiconductor switch Q3 turned off in a case where the energy accumulated in the first capacitor C1 is greater than the energy accumulated in the second capacitor C2.

As illustrated in FIG. 8A, in a case where the energy accumulated in the first capacitor C1 is greater than the energy accumulated in the second capacitor C2, the following current path is formed when the third semiconductor switch Q3 is turned on and the fourth semiconductor switch Q4 is turned off. In other words, a current path is formed that starts from the first capacitor C1 and returns to the first capacitor C1 through the second connection point 12, the fifth connection point 15, the third semiconductor switch Q3, the sixth connection point 16, the second reactor L2, and the third connection point 13 in order. This causes the energy accumulated in the first capacitor C1 to be accumulated in the second reactor L2.

As illustrated in FIG. 8(b), in this case, the following current path is then formed when the third semiconductor switch Q3 is turned off and the fourth semiconductor switch Q4 is turned off. In other words, a current path is formed that starts from the second reactor L2 and returns to the second reactor L2 through the third connection point 13, the second capacitor C2, the fourth connection point 14, the seventh connection point 17, the fourth diode D4, and the sixth connection point 16 in order. This causes the energy accumulated in the second reactor L2 to be accumulated in the second capacitor C2 and the second capacitor C2 is charged. This causes the voltage VC1 of the first capacitor C1 and the voltage VC2 of the second capacitor C2 to have balance (to be even).

It is to be noted that equal energies flow in the first capacitor C1 and the second capacitor C2 at a chopper duty of 100%. This causes the voltage VC1 of the first capacitor C1 and the voltage VC2 of the second capacitor C2 to have balance (to be even). In this case, it is unnecessary to switch the third semiconductor switch Q3 and the fourth semiconductor switch Q4. Therefore, the chopper circuit 10A includes a circuit including the third semiconductor switch Q3, the fourth semiconductor switch Q4, and the second reactor L2, but no current flows in these. In other words, in the chopper circuit 10A, a current passes through only one semiconductor switch at a chopper duty of 100%, but does not always pass through two semiconductor switches.

<Control Scheme According to Second Embodiment>

Figure 9:
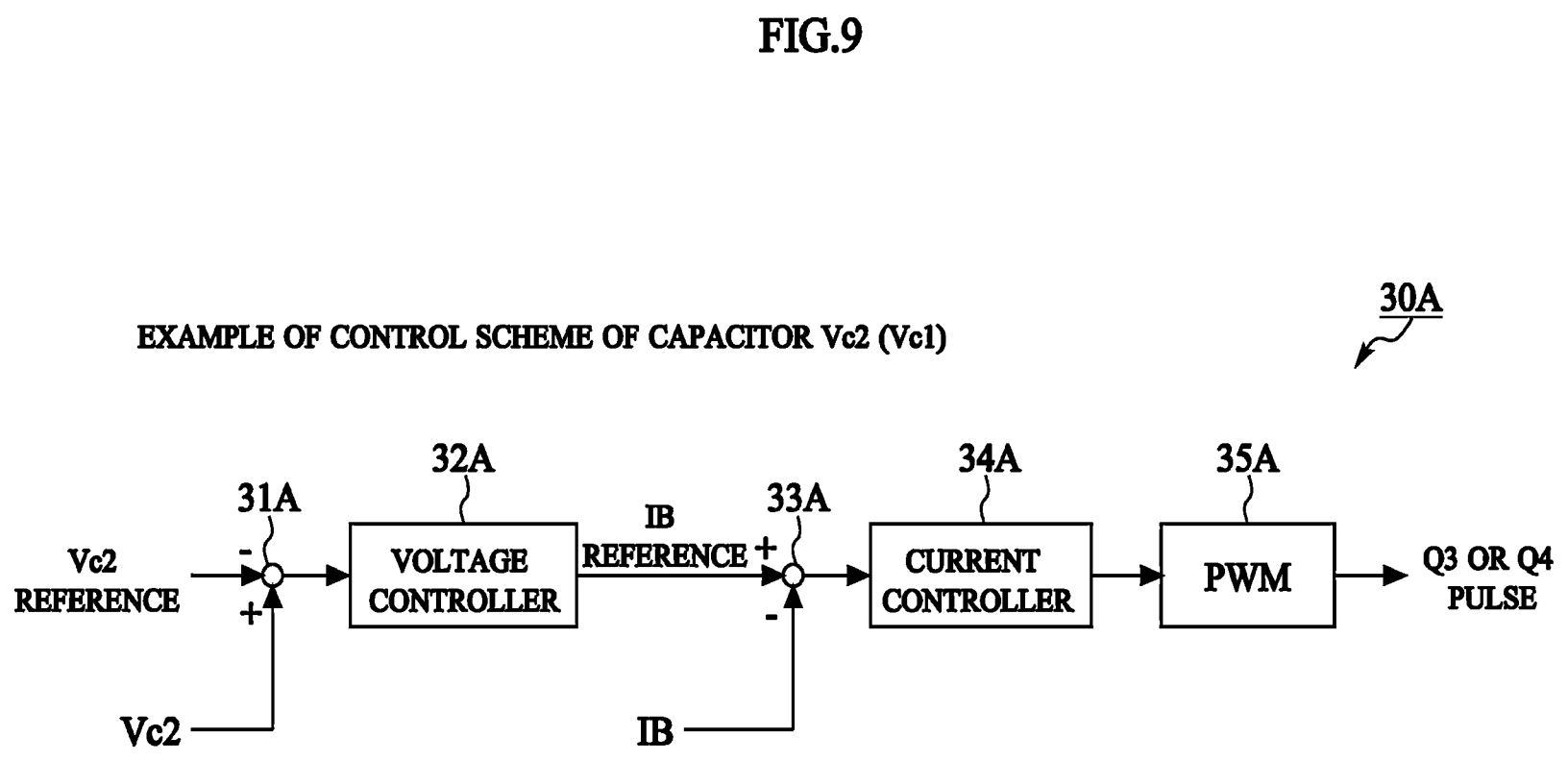

FIG. 9 is a diagram illustrating an example of a configuration of the control device 30A in the DC power converter 1A illustrated in FIGS. 6 to 8 and a control scheme in which voltage balance is controlled between the first capacitor C1 and the second capacitor C2.

As described above, the control device 30A has a function similar to that of the control device 30 according to the first embodiment illustrated in FIGS. 1 to 5. The control device 30A therefore controls operations of the first semiconductor switch Q1 and the second semiconductor switch Q2 in accordance with the control scheme described in FIGS. 4 and 5. Further, the control device 30A controls operations of the third semiconductor switch Q3 and the fourth semiconductor switch Q4 as described below.

It is to be noted that the control device 30A controls operations of the third semiconductor switch Q3 and the fourth semiconductor switch Q4 to turn off both the third semiconductor switch Q3 and the fourth semiconductor switch Q4 when the chopper duty of the chopper circuit 10A is 100%. This is because equal energies flow in the first capacitor C1 and the second capacitor C2 at a chopper duty of 100% as described above and the voltage VC1 of the first capacitor C1 and the voltage VC2 of the second capacitor C2 thus have balance (are even).

As described above, the control device 30A functions as a first subtractor 31A, a voltage controller 32A, a second subtractor 33A, a current controller 34A, and a PWM control section 35A by executing the predetermined programs. Each of the sections described above performs the following processing by executing a predetermined program.

The first subtractor 31A performs processing similar to that of the first subtractor 31 according to the first embodiment illustrated in FIGS. 1 to 5. Further, the first subtractor 31A obtains a VC2 reference, for example, from the memory 92 (see FIG. 13) described below. Here, the VC2 reference is a predetermined voltage reference value (voltage command value) for performing control to cause the value of the voltage VC2 of the second capacitor C2 to be even with the value of the voltage VC1 of the first capacitor C1. In addition, the VC2 reference is also a predetermined voltage reference value (voltage command value) for performing control to cause the value of the voltage VC2 of the second capacitor C2 to be less than or equal to the value of the voltage VVb of the DC power supply Vb. It is to be noted that the first subtractor 31A may calculate the VC2 reference, for example, on the basis of a predetermined calculation or the like or obtain the VC2 reference by receiving an instruction from an unillustrated higher-level device, an unillustrated operator, or the like.

In addition, the first subtractor 31A obtains the value of the voltage VC2 of the second capacitor C2 from the third voltage sensor 24 (see FIG. 6) (the value is fed back). The first subtractor 31A then subtracts the obtained (or calculated) VC2 reference from the obtained value of the voltage VC2 and outputs the value resulting from the subtraction to the voltage controller 32A.

The voltage controller 32A performs processing similar to that of the voltage controller 32 according to the first embodiment illustrated in FIGS. 1 to 5. Further, the voltage controller 32A performs, for example, PI control or the like on the value obtained from the first subtractor 31A to obtain an IB reference. Here, the IB reference is a reference value (current command value) of a current to be applied to the second reactor L2 for performing control to cause the value of the voltage VC2 of the second capacitor C2 to be even with the value of the voltage VC1 of the first capacitor C1. The voltage controller 32A outputs the obtained IB reference to the second subtractor 33A. It is to be noted that the first subtractor 31A and the voltage controller 32A are examples of the "voltage control section", the VC2 reference is an example of a "fifth voltage command value", and the IB reference is an example of a "third current command value".

The second subtractor 33A performs processing similar to that of the second subtractor 33 according to the first embodiment illustrated in FIGS. 1 to 5. Further, the second subtractor 33A obtains the IB reference from the voltage controller 32A. In addition, the second subtractor 33A obtains the value of the current IB flowing to the second reactor L2 from the second current sensor 25 (see FIG. 6) (the value is fed back). The second subtractor 33A then subtracts the obtained value of the current IB from the obtained IB reference and outputs the value resulting from the subtraction to the current controller 34A.

The current controller 34A performs processing similar to that of the current controller 34 according to the first embodiment illustrated in FIGS. 1 to 5. Further, the current controller 34A performs, for example, PI control or the like on the value obtained from the second subtractor 33A to obtain a voltage command value V3* that is a command for performing control to cause the value of the voltage VC2 of the second capacitor C2 to be even with the value of the voltage VC1 of the first capacitor C1. The current controller 34A outputs the obtained voltage command value V3* to the PWM control section 35A. It is to be noted that the second subtractor 33A and the current controller 34A are examples of the "current control section" and the voltage command value V3* is an example of a "sixth voltage command value".

The PWM control section 35A performs processing similar to that of the PWM control section 35 according to the first embodiment illustrated in FIGS. 1 to 5. Further, the PWM control section 35A performs PWM control on the basis of the voltage command value V3* obtained from the current controller 34A and, for example, a predetermined triangular wave carrier signal. The PWM control section 35A then generates a gate signal that is a pulse width modulation (PWM) signal for controlling an operation of at least any one of the third semiconductor switch Q3 and the fourth semiconductor switch Q4. The PWM control section 35A outputs the generated gate signal (Q3 or Q4 pulse) to at least any one of the third semiconductor switch Q3 and the fourth semiconductor switch Q4. The PWM control section 35A then controls an ON/OFF operation of at least any one of the third semiconductor switch Q3 and the fourth semiconductor switch Q4. It is to be noted that the Q3 and Q4 pulses are examples of a "third pulse".

It is to be noted that the PWM control section 35A controls operations of the third semiconductor switch Q3 and the fourth semiconductor switch Q4 to turn off both the third semiconductor switch Q3 and the fourth semiconductor switch Q4 when the chopper duty of the chopper circuit 10A is 100%.

In the DC power converter 1A (chopper circuit 10A), an ON/OFF operation of at least any one of the third semiconductor switch Q3 and the fourth semiconductor switch Q4 is controlled in accordance with the control scheme described above. This makes it possible to perform control to cause the voltage VC1 of the first capacitor C1 and the voltage VC2 of the second capacitor C2 to have even or any balance.

It is to be noted that the description above has described the control scheme for performing control to cause the value of the voltage VC2 of the second capacitor C2 to be even with the value of the voltage VC1 of the first capacitor C1. Conversely, the control device 30A may, however, perform control to cause the value of the voltage VC1 of the first capacitor C1 to be even with the value of the voltage VC2 of the second capacitor C2.

In this case, the first subtractor 31A obtains (calculates) a VC1 reference and the value of the voltage VC1 of the first capacitor C1 is obtained (fed back). The first subtractor 31A then subtracts the obtained (calculated) VC1 reference from the obtained value of the voltage VC1 and outputs the value resulting from the subtraction to the voltage controller 32A. After this, control similar to the control described above is performed. In this case, the gate signal (Q3 or Q4 pulse) generated and output by the PWM control section 35A is a pulse that is reverse to the gate signal (Q3 or Q4 pulse) generated and output in the description above. However, even such a control scheme allows the control device 30A to perform control to cause the voltage VC1 of the first capacitor C1 and the voltage VC2 of the second capacitor C2 to have even or any balance as with the control scheme described above.

<Workings and Effects of Second Embodiment>

As described above, the second embodiment illustrated in FIGS. 6 to 9 attains the workings and effects similar to those of the first embodiment illustrated in FIGS. 1 to 5.

Further, according to the second embodiment illustrated in FIGS. 6 to 9, it is possible to transfer the charging energy of the second capacitor C2 to the first capacitor C1 through the second reactor L2 in the chopper circuit 10A. In addition, it is possible to transfer the charging energy of the first capacitor C1 to the second capacitor C2 through the second reactor L2 in the chopper circuit 10A. This makes it possible to perform control to cause the voltage VC1 of the first capacitor C1 and the voltage VC2 of the second capacitor C2 to have even or any voltage balance by controlling the switching of the third semiconductor switch Q3 and the fourth semiconductor switch Q4.

In addition, according to the second embodiment illustrated in FIGS. 6 to 9, it is possible to optimize the voltage VC2 of the second capacitor C2 to cause the first reactor L1 to have reduced ripple currents by controlling the switching of the third semiconductor switch Q3 and the fourth semiconductor switch Q4.

In addition, according to the second embodiment illustrated in FIGS. 6 to 9, the voltage VC1 of the first capacitor C1 and the voltage VC2 of the second capacitor C2 have balance (are even) at a chopper duty of 100%. This makes it unnecessary to switch the third semiconductor switch Q3 and the fourth semiconductor switch Q4. No current thus flows in the third semiconductor switch Q3 or the fourth semiconductor switch Q4 in this case. In this case, a current passes through only one semiconductor switch (does not always pass through two semiconductor switches). This allows the semiconductor switch to have reduced total loss and makes it possible to increase the efficiency as compared with a conventional scheme in which a current inevitably passes through the two semiconductor switches.

In addition, according to the second embodiment illustrated in FIGS. 6 to 9, it is possible to control the voltage VC2 of the second capacitor C2 to cause the voltage VC2 of the second capacitor C2 to be less than or equal to the voltage VVb of the DC power supply Vb by controlling the switching of the third semiconductor switch Q3 and the fourth semiconductor switch Q4. This makes it possible to control and optimize the voltage VC2 of the second capacitor C2 to bring the voltage VC2 of the second capacitor C2 closer to the voltage VVb of the DC power supply Vb. It is possible to cause the first reactor L1 to have reduced ripples.

Third Embodiment

Figure 10:
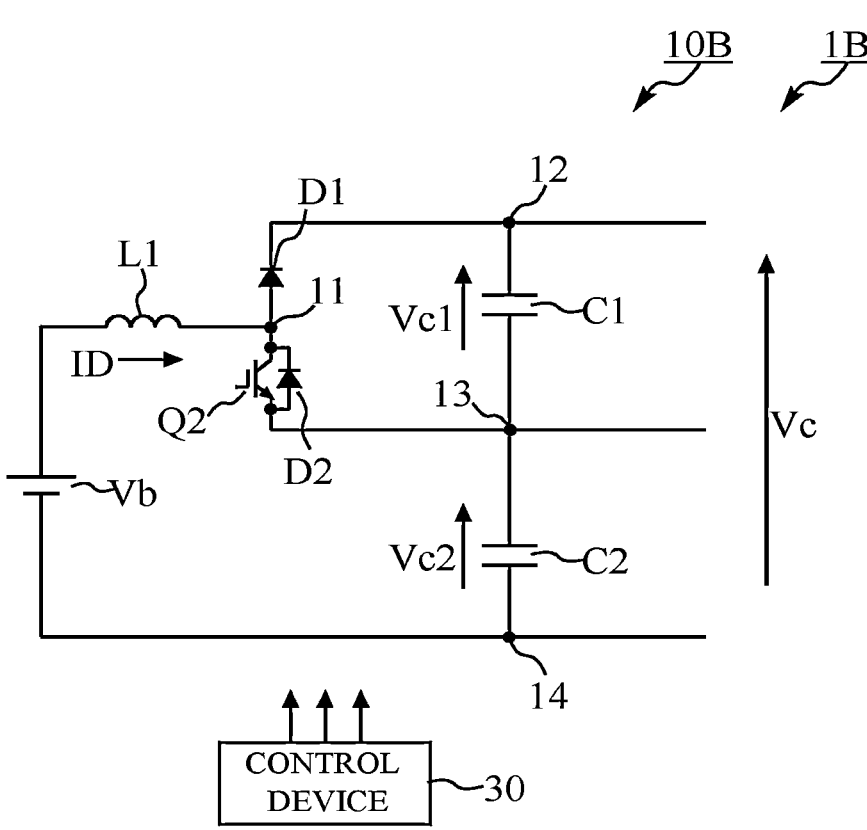
FIG. 10 is a diagram illustrating an example of a configuration of a chopper circuit in a DC power converter according to a third embodiment.

FIG. 10 is a diagram illustrating an example of a configuration of a chopper circuit 10B in a DC power converter 1B according to a third embodiment.

In the third embodiment, the components that are the same as or similar to the components according to the first embodiment and the second embodiment illustrated in FIGS. 1 to 9 will be denoted by the same reference numerals. Duplicate description or detailed description will be thus omitted or simplified. The chopper circuit 10B according to the third embodiment is obtained by omitting the first semiconductor switch Q1 in the chopper circuit 10 according to the first embodiment illustrated in FIGS. 1 to 5 and connecting the first diode D1 alone to this position. The other components, the understanding of the control schemes, and the like are similar to those of the step-up mode according to the first embodiment illustrated in FIGS. 1 to 5.

The DC power converter 1B (chopper circuit 10B) according to the third embodiment performs only the step-up mode. In other words, for example, if the DC power converter 1 (chopper circuit 10) performs only the step-up mode, it is possible to omit the first semiconductor switch Q1 and include the first diode D1 alone at this position. According to even the third embodiment illustrated in FIG. 10 like this, it is possible to attain workings and effects similar to those of the step-up mode according to the first embodiment illustrated in FIGS. 1 to 5.

It is to be noted that, though not illustrated, if the DC power converter 1A (chopper circuit 10A) according to the second embodiment illustrated in FIGS. 6 to 9 also performs only the step-up mode, it is possible to omit the first semiconductor switch Q1 and include the first diode D1 alone at this portion. According to even such a configuration, it is possible to attain workings and effects similar to those of the step-up mode according to the second embodiment illustrated in FIGS. 6 to 9.

Fourth Embodiment

Figure 11:
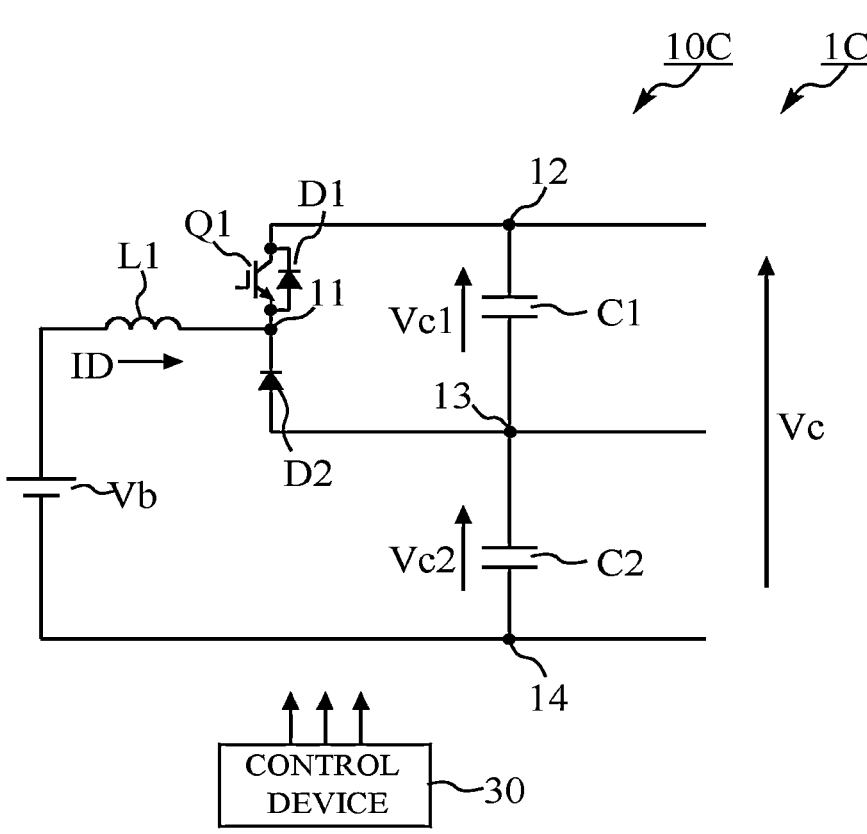
FIG. 11 is a diagram illustrating an example of a configuration of a chopper circuit in a DC power converter according to a fourth embodiment.

FIG. 11 is a diagram illustrating an example of a configuration of a chopper circuit 10C in a DC power converter 1C according to a fourth embodiment.

In the fourth embodiment, the components that are the same as or similar to the components according to the first embodiment and the second embodiment illustrated in FIGS. 1 to 9 will be denoted by the same reference numerals. Duplicate description or detailed description will be thus omitted or simplified. The chopper circuit 10C according to the fourth embodiment is obtained by omitting the second semiconductor switch Q2 in the chopper circuit 10 according to the first embodiment illustrated in FIGS. 1 to 5 and connecting the second diode D2 alone to this position. The other components, the understanding of the control schemes, and the like are similar to those of the step-down mode according to the first embodiment illustrated in FIGS. 1 to 5.

The DC power converter 1C (chopper circuit 10C) according to the fourth embodiment performs only the step-down mode. In other words, for example, if the DC power converter 1 (chopper circuit 10) performs only the step-down mode, it is possible to omit the second semiconductor switch Q2 and include the second diode D2 alone at this position. According to even the fourth embodiment illustrated in FIG. 11 like this, it is possible to attain workings and effects similar to those of the step-down mode according to the first embodiment illustrated in FIGS. 1 to 5.

It is to be noted that, though not illustrated, if the DC power converter 1A (chopper circuit 10A) according to the second embodiment illustrated in FIGS. 6 to 9 also performs only the step-down mode, it is possible to omit the second semiconductor switch Q2 and include the second diode D2 alone at this portion. Even such a configuration makes it possible to attain workings and effects similar to those of the step-down mode according to the second embodiment illustrated in FIGS. 6 to 9.

Fifth Embodiment

Figure 12:
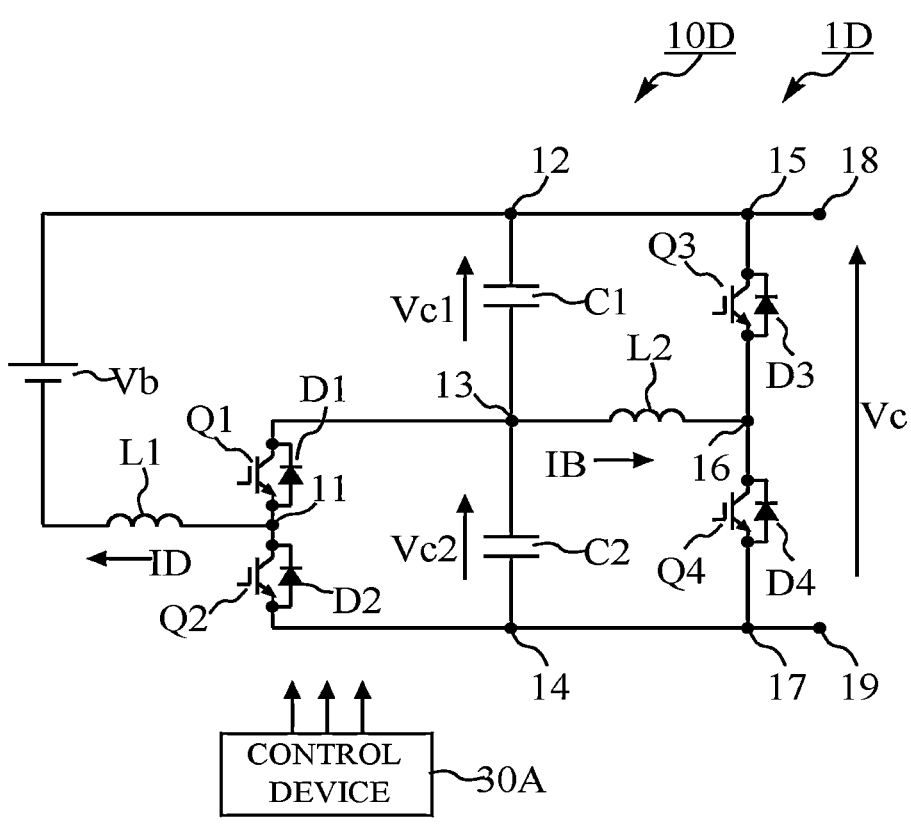
FIG. 12 is a diagram illustrating an example of a configuration of a chopper circuit in a DC power converter according to a fifth embodiment.

FIG. 12 is a diagram illustrating an example of a configuration of a chopper circuit 10D in a DC power converter 1D according to a fifth embodiment.

In the fifth embodiment, the components that are the same as or similar to the components according to the first embodiment to the fourth embodiment illustrated in FIGS. 1 to 11 will be denoted by the same reference numerals. Duplicate description or detailed description will be thus omitted or simplified. The chopper circuit 10D in the DC power converter 1D according to the fifth embodiment has a configuration in which the positive electrode side and the negative electrode side of the chopper circuit 10A are exchanged in the DC power converter 1A according to the second embodiment illustrated in FIGS. 6 to 9. The other components, the understanding of the control schemes, and the like are similar to those of the second embodiment illustrated in FIGS. 6 to 9.

In other words, the negative electrode side of the DC power supply Vb is connected to the second capacitor C2 in the chopper circuit 10A according to the second embodiment illustrated in FIGS. 6 to 9, but the positive electrode side of the DC power supply Vb is connected to the first capacitor C1 in the chopper circuit 10D according to the fifth embodiment illustrated in FIG. 12. According to even the configuration according to the fifth embodiment illustrated in FIG. 12 like this, it is possible to attain workings and effects similar to those of the second embodiment illustrated in FIGS. 6 to 9.

It is to be noted that, though not illustrated, the chopper circuit 10 in the DC power converter 1 according to the first embodiment illustrated in FIGS. 1 to 5 may also have a configuration in which the positive electrode side and the negative electrode side are exchanged. In other words, the negative electrode side of the DC power supply Vb is connected to the second capacitor C2 in the chopper circuit 10 according to the first embodiment illustrated in FIGS. 1 to 5, but the positive electrode side of the DC power supply Vb may be connected to the first capacitor C1. According to even such a configuration, it is possible to attain workings and effects similar to those of the first embodiment illustrated in FIGS. 1 to 5.

In addition, it is possible to adopt configurations similar to the configuration according to the fifth embodiment illustrated in FIG. 12 even in the third embodiment illustrated in FIG. 10 and the fourth embodiment illustrated in FIG. 11. In this case, it is also possible to attain workings and effects similar to those of the third embodiment illustrated in FIG. 10 and the fourth embodiment illustrated in FIG. 11.

<Hardware Configuration Example>

Figure 13:
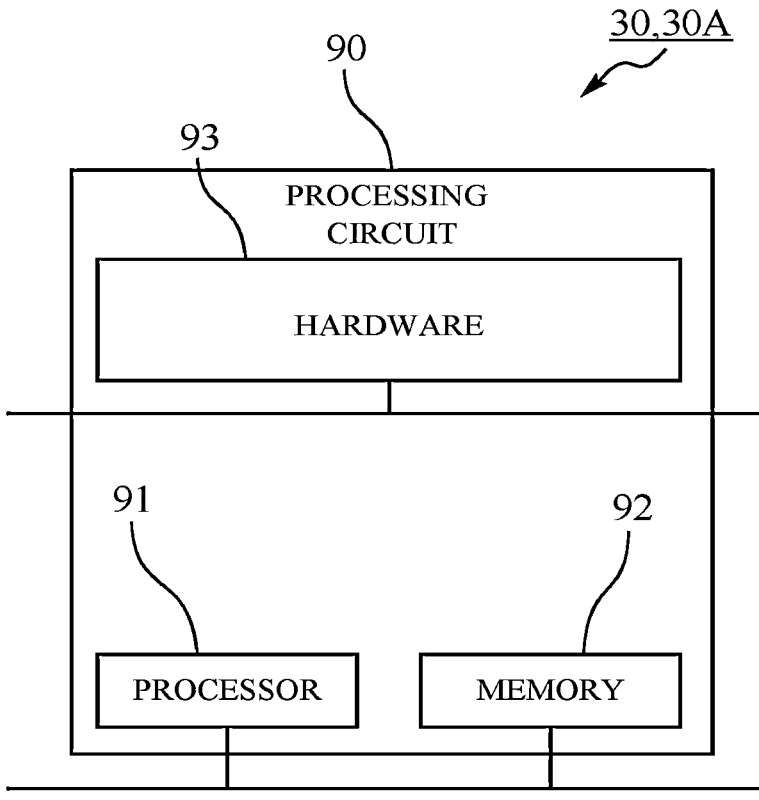
FIG. 13 is a conceptual diagram illustrating a hardware configuration example of a processing circuit included in the control device in the embodiments illustrated in FIGS. 1 to 12.
Figure 14:
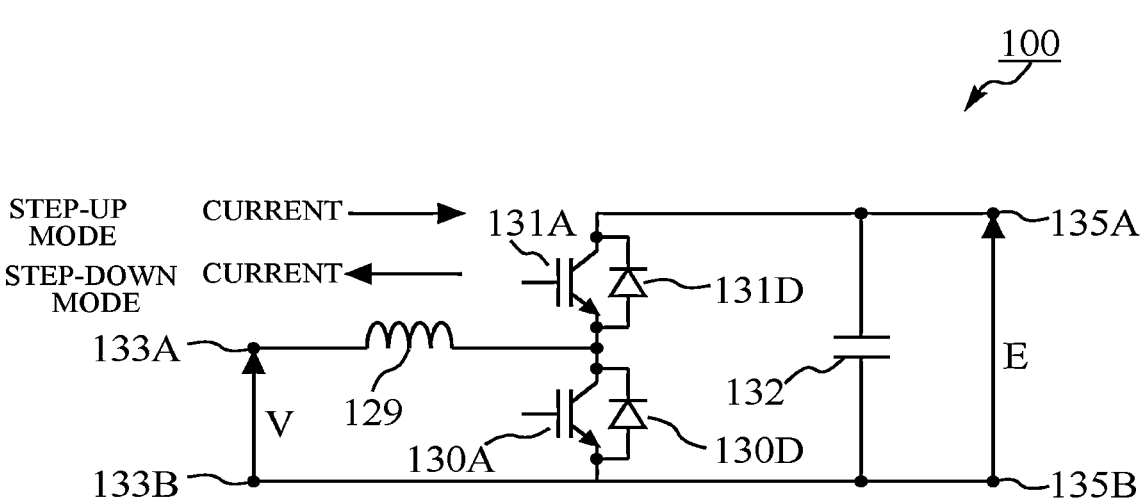
FIG. 14 is a diagram illustrating an example of a configuration of a conventional chopper circuit capable of a bidirectional operation.
Figure 15:
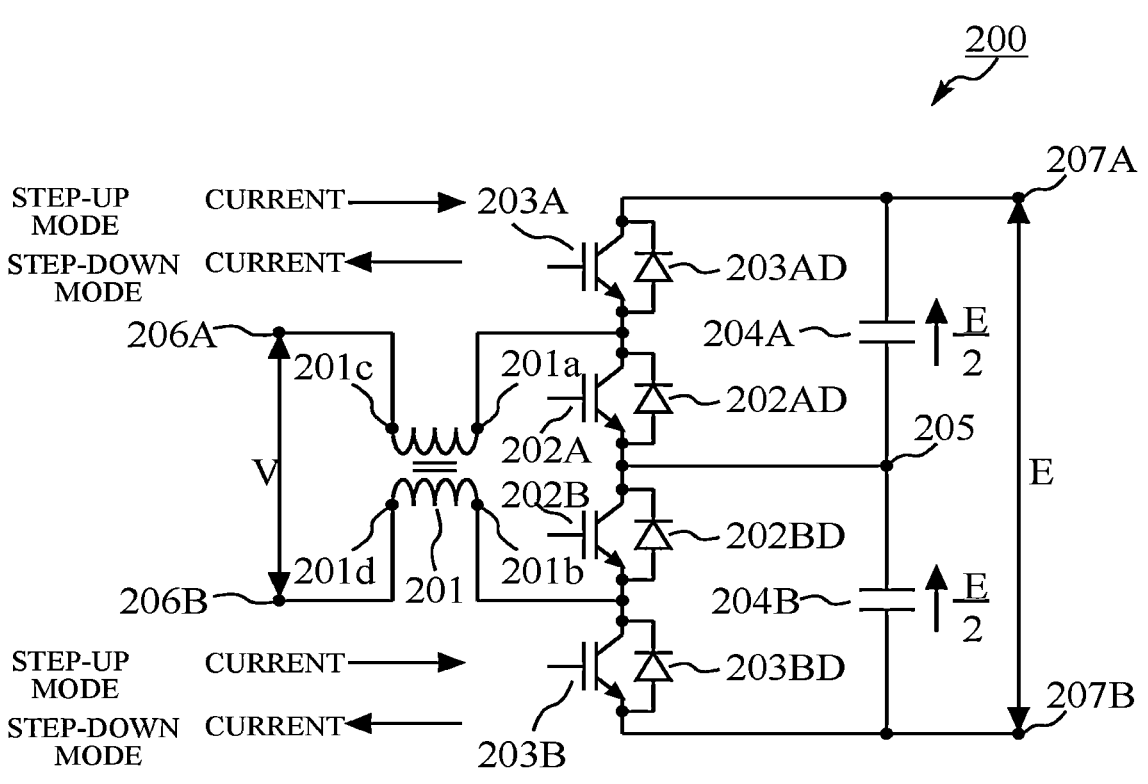
FIG. 15 is a diagram illustrating an example of a configuration of a different conventional chopper circuit capable of a bidirectional operation.

FIG. 13 is a conceptual diagram illustrating a hardware configuration example of a processing circuit 90 included in any of the control devices 30 and 30A in the embodiments illustrated in FIGS. 1 to 12. Each of the functions described above is implemented by the processing circuit 90. According to an aspect, the processing circuit 90 includes the at least one processor 91 and the at least one memory 92. According to another aspect, the processing circuit 90 includes the at least one dedicated hardware 93.

In a case where the processing circuit 90 includes the processor 91 and the memory 92, the respective functions are implemented by software, firmware, or a combination of the software and the firmware. At least one of the software and the firmware is described as a program. At least one of the software and the firmware is stored in the memory 92. The processor 91 reads out and executes the program stored in the memory 92 to implement the respective functions.

In a case where the processing circuit 90 includes the dedicated hardware 93, the processing circuit 90 is, for example, a single circuit, a composite circuit, a programmed processor, or a combination thereof. Each of the functions is implemented by the processing circuit 90.

The respective functions of the control devices 30 and 30A may be each configured partially or entirely by hardware or configured as a program to be executed by a processor. In other words, it is possible to implement each of the control devices 30 and 30A by using a computer and a program. It is possible to store the program in a storage medium and provide the program through a network.

<Supplemental Notes of Embodiments>

The embodiments illustrated in FIGS. 1 to 12 described above are divided into the first embodiment illustrated in FIGS. 1 to 5, the second embodiment illustrated in FIGS. 6 to 9, the third embodiment illustrated in FIG. 10, the fourth embodiment illustrated in FIG. 11, and the fifth embodiment illustrated in FIG. 12. These embodiments may be, however, combined in series or in parallel. It is also possible for a combination of the embodiments to attain workings and effects similar to the respective workings and effects attained by the respective embodiments that have not yet been combined.

It is to be noted that, though not illustrated, it is possible to include the third diode D3 alone at the position of the third semiconductor switch Q3 in the DC power converter 1A (chopper circuit 10A) according to the second embodiment illustrated in FIGS. 6 to 9 in a case where the voltages of the capacitors always satisfy VC1<VC2. In contrast, though not illustrated, it is possible to include the fourth diode D4 alone at the position of the fourth semiconductor switch Q4 in the DC power converter 1A (chopper circuit 10A) according to the second embodiment illustrated in FIGS. 6 to 9 in a case where the voltages of the capacitors always satisfy VC2<VC1. According to these configurations, it is also possible to attain workings and effects similar to those of the second embodiment illustrated in FIGS. 6 to 9.

In addition, according to the embodiment illustrated in FIGS. 1 to 12, the DC power converters 1 to 1D and the control devices 30 and 30A included in these have been described as examples as an aspect of the present disclosure, but these are not limitative. It is also possible to implement the present disclosure as a control method in which processing steps are performed by the respective sections of the control devices 30 and 30A.

In addition, it is also possible to implement the present disclosure as a control program that causes a computer to execute the processing steps of the respective sections of the control devices 30 and 30A.

In addition, it is also possible to implement the present disclosure as a storage medium (non-transitory computer-readable storage medium) in which the control program is stored. It is possible to store the control program, for example, in a removable medium or the like such as a CD (Compact Disc), a DVD (Digital Versatile Disc), or a USB (Universal Serial Bus) memory and distribute the control program. It is to be noted that the control program may be uploaded to a network through an unillustrated network interface or the like included in any of the control devices 30 and 30A, or may be downloaded from the network and stored in the memory 92 or the like.

The detailed description above would clarify the features and advantages of the embodiments. This intends that the claims cover the features and advantages of the embodiments as described above within the range that does not depart from the spirits and the scope of the claims. In addition, a person having ordinary skill in the art would have conceived of any improvements and modifications with ease. The scope of each of the embodiments having inventiveness is not thus intended to be limited to the scope described above. It is also possible to depend on appropriate improved products and equivalents included in the scope disclosed in each embodiment.

REFERENCE SIGNS LIST 1, 1A, 1B, 1C, 1D DC . . . Power converter; 10, 10A, 10B, 10C, 10D . . . Chopper circuit; 11 . . . First connection point; 12 . . . Second connection point; 13 . . . Third connection point; 14 . . . Fourth connection point; 15 . . . Fifth connection point; 16 . . . Sixth connection point; 17 . . . Seventh connection point; 18 . . . First terminal; 19 . . . Second terminal; 21 . . . First voltage sensor; 22 . . . First current sensor; 23 . . . Second voltage sensor; 24 . . . Third voltage sensor; 25 . . . Second current sensor; 30, 30A . . . Control device; 31, 31A . . . First subtractor; 32, 32A . . . Voltage controller; 33, 33A . . . Second subtractor; 34, 34A . . . Current controller; 35, 35A . . . PWM control section; 90 . . . Processing circuit; 91 . . . Processor; 92 . . . Memory; 93 . . . Hardware; 100 . . . Chopper circuit; 129 . . . Reactor; 130A, 131A . . . Semiconductor switch; 130D, 131D . . . Diode; 132 . . . Smoothing capacitor; 133A, 133B, 135A, 135B . . . Circuit terminal; 200 . . . Chopper circuit; 201 . . . Reactor; 201a, 201b, 201c . . . Terminal; 202A, 202B, 203A, 203B . . . Semiconductor switch; 202AD, 202BD, 203AD, 203BD . . . Diode; 204A, 204B . . . Smoothing capacitor; 205 . . . Neutral point (virtual ground); 206A, 207A . . . Circuit terminal; 210 . . . DC power converter; 211 . . . Battery; 214A, 214B . . . Stray capacitance; 215 . . . Intermediate potential; 300 . . . DC power converter; 300a, 300b, 300c . . . Connection point; 301 . . . Chopper circuit; 303Q, 304Q, 305Q, 306Q . . . Power semiconductor device; 313 . . . Capacitor; 316 . . . Capacitor; 321 . . . Reactor; 323 . . . Capacitor; C1 . . . First capacitor; C2 . . . Second capacitor; D1 . . . First diode; D2 . . . Second diode; D3 . . . Third diode; D4 . . . Fourth diode; E . . . Voltage; IB . . . Current; ID . . . Current; L1 . . . First reactor; L2 . . . Second reactor; Q1 . . . First semiconductor switch; Q2 . . . Second semiconductor switch; Q3 . . . Third semiconductor switch; Q4 . . . Fourth semiconductor switch; V . . .

Voltage; V . . . Power supply; V1*, V2*, V3* . . . Voltage command value; Vb . . . DC power supply (battery); VC, VC1, VC2 . . . Voltage; VVb . . . Voltage

The invention claimed is:

1. A DC power converter comprising:
a chopper circuit including
a first switch that is connected in series between a first connection point and a second connection point,
    a first diode that is connected in antiparallel with the first switch,
    a second switch that is connected in series between the first connection point and a third connection point,
    a second diode that is connected in antiparallel with the second switch,
    a first capacitor that is connected in series between the second connection point and the third connection point,
    a second capacitor that is connected in series between the third connection point and a fourth connection point, and
    a DC power supply and a first reactor that are connected in series in order between the fourth connection point and the first connection point, wherein in a step-up mode, in the chopper circuit,
    a current path is formed when the first switch is off and the second switch is on, the current path starting from the DC power supply and returning to the DC power supply through the first reactor, the first connection point, the second switch, the third connection point, the second capacitor, and the fourth connection point in order, and
    a current path is formed when the first switch is off and the second switch is off, the current path starting from DC power supply and returning to the DC power supply through the first reactor, the first connection point, the first diode, the second connection point, the first capacitor, the third connection point, the second capacitor, and the fourth connection point in order, and wherein
in a step-down mode, in the chopper circuit,
    a current path is formed when the first switch is on and the second switch is off, the current path starting from the second capacitor and returning to the second capacitor through the third connection point, the first capacitor, the second connection point, the first switch, the first connection point, the first reactor, the DC power supply, and the fourth connection point in order, and
    a current path is formed when the first switch is off and the second switch is off, the current path starting from the second capacitor and returning to the second capacitor through the third connection point, the second diode, the first connection point, the first reactor, the DC power supply, and the fourth connection point in order.

2. The DC power converter according to claim 1, further comprising:
a control device including a voltage control section, a current control section, and a PWM control section, the control device being configured to control the chopper circuit, wherein
in the step-up mode, in the control device,
    the voltage control section is configured to calculate a first current command value on a basis of a value of a voltage of the first capacitor, a value of a voltage of the second capacitor, and a predetermined first voltage command value, the predetermined first voltage command value being for controlling the values of the voltages of the first capacitor and the second capacitor to be constant values, the first current command value being for controlling a value of a current to be applied to the first reactor, the current control section is configured to calculate a second voltage command value on a basis of the first current command value calculated by the voltage control section and a value of a current flowing to the first reactor, the second voltage command value being a duty command of the step-up mode, and the PWM control section is configured to output a first pulse on a basis of the second voltage command value calculated by the current control section and a predetermined carrier signal, the first pulse being for controlling an operation of the second switch.

3. The DC power converter according to claim 1, further comprising:

a control device including a voltage control section, a current control section, and a PWM control section, the control device being configured to control the chopper circuit, wherein in the step-down mode, in the control device, the voltage control section is configured to calculate a second current command value on a basis of a predetermined third voltage command value and a value of a voltage of the DC power supply, the predetermined third voltage command value being for controlling the value of the voltage of the DC power supply to be a constant value, the second current command value being for controlling a value of a current to be applied to the first reactor, the current control section is configured to calculate a fourth voltage command value on a basis of the second current command value calculated by the voltage control section and a value obtained by multiplying a value of a current flowing to the first reactor by −1, the fourth voltage command value being a duty command of the step-down mode, and the PWM control section is configured to output a second pulse on a basis of the fourth voltage command value calculated by the current control section and a predetermined carrier signal, the second pulse being for controlling an operation of the first switch.

4. The DC power converter according to claim 1, wherein the chopper circuit further includes a third switch that is connected in series between a fifth connection point between the second connection point and a first terminal, and a sixth connection point, a third diode that is connected in antiparallel with the third switch, a fourth switch that is connected in series between the sixth connection point, and a seventh connection point between the fourth connection point and a second terminal, a fourth diode that is connected in antiparallel with the fourth switch, and a second reactor that is connected in series between the third connection point and the sixth connection point, wherein when energy accumulated in the second capacitor is greater than energy accumulated in the first capacitor, the energy accumulated in the second capacitor is accumulated in the second reactor by forming a current path when the third switch is off and the fourth switch is on, the current path starting from the second capacitor and returning to the second capacitor through the third connection point, the second reactor, the sixth connection point, the fourth switch, the seventh connection point, and the fourth connection point in order, and the energy accumulated in the second reactor is accumulated in the first capacitor by forming a current path when the third switch is off and the fourth switch is off, the current path starting from the second reactor and returning to the second reactor through the sixth connection point, the third diode, the fifth connection point, the second connection point, the first capacitor, and the third connection point in order, and wherein when the energy accumulated in the first capacitor is greater than the energy accumulated in the second capacitor, the energy accumulated in the first capacitor is accumulated in the second reactor by forming a current path when the third switch is on and the fourth switch is off, the current path starting from the first capacitor and returning to the first capacitor through the second connection point, the fifth connection point, the third switch, the sixth connection point, the second reactor, and the third connection point in order, and the energy accumulated in the second reactor is accumulated in the second capacitor by forming a current path when the third switch is off and the fourth switch is off, the current path starting from the second reactor and returning to the second reactor through the third connection point, the second capacitor, the fourth connection point, the seventh connection point, the fourth diode, and the sixth connection point in order.

5. The DC power converter according to claim 4, further comprising:

a control device including a voltage control section, a current control section, and a PWM control section, the control device being configured to control the chopper circuit, wherein when a chopper duty of the chopper circuit is not 100%, in the control device, the voltage control section is configured to calculate a third current command value on a basis of a predetermined fifth voltage command value and a value of a voltage of the second capacitor, the predetermined fifth voltage command value being for performing control to cause the value of the voltage of the second capacitor to be even with a value of a voltage of the first capacitor, the third current command value being for controlling a value of a current to be applied to the second reactor, the current control section is configured to calculate a sixth voltage command value on a basis of the third current command value calculated by the voltage control section and a value of a current flowing to the second reactor, the sixth voltage command value being a command for performing control to cause the value of the voltage of the second capacitor to be even with the value of the voltage of the first capacitor, and the PWM control section is configured to output a third pulse on a basis of the sixth voltage command value calculated by the current control section and a predetermined carrier signal, the third pulse being for controlling an operation of at least any one of the third switch and the fourth switch.

6. The DC power converter according to claim 5,
wherein the fifth voltage command value is a command
value for performing control to cause the value of the
voltage of the second capacitor to be less than or equal
to a value of a voltage of the DC power supply.

7. The DC power converter according to claim 5,
wherein, when the chopper duty of the chopper circuit is
100%, the control device is configured to control to turn
off both the third switch and the fourth switch.

8. A DC power converter comprising:
a chopper circuit including
    a first diode that is connected in series between a first
connection point and a second connection point,
    a first switch that is connected in series between the first
connection point and a third connection point,
    a second diode that is connected in antiparallel with the
first switch,
    a first capacitor that is connected in series between the
second connection point and the third connection
point,
    a second capacitor that is connected in series between
the third connection point and a fourth connection
point, and
    a DC power supply and a first reactor that are connected
in series in order between the fourth connection point
and the first connection point, wherein in a step-up
mode, in the chopper circuit,
    a current path is formed when the first switch is on, the
current path starting from the DC power supply and
returning to the DC power supply through the first
reactor, the first connection point, the first switch, the
third connection point, the second capacitor, and the
fourth connection point in order, and
    a current path is formed when the first switch is off, the
current path starting from the DC power supply and
returning to the DC power supply through the first
reactor, the first connection point, the first diode, the
second connection point, the first capacitor, the third
connection point, the second capacitor, and the
fourth connection point in order.

9. A DC power converter comprising:
a chopper circuit including
    a first switch that is connected in series between a first
connection point and a second connection point,
    a first diode that is connected in antiparallel with the
first switch,
    a second diode that is connected in series between the
first connection point and a third connection point,
    a first capacitor that is connected in series between the
second connection point and the third connection
point,
    a second capacitor that is connected in series between
the third connection point and a fourth connection
point, and
    a DC power supply and a first reactor that are connected
in series in order between the fourth connection point
and the first connection point, wherein in a step-
down mode, in the chopper circuit,
    a current path is formed when the first switch is on, the
current path starting from the second capacitor and
returning to the second capacitor through the third
connection point, the first capacitor, the second con-
nection point, the first switch, the first connection
point, the first reactor, the DC power supply, and the
fourth connection point in order, and
    a current path is formed when the first switch is off, the
current path starting from the second capacitor and
returning to the second capacitor through the third
connection point, the second diode, the first connec-
tion point, the first reactor, the DC power supply, and
the fourth connection point in order.

* * * * *